United States Patent [19]

Myers

[11] Patent Number: 5,082,346

[45] Date of Patent: Jan. 21, 1992

[54] FIELD-ASSEMBLABLE MULTIFIBER OPTICAL CONNECTOR

[75] Inventor: Clyde J. Myers, Stone Mountain, Ga.

[73] Assignee: AT&T Bell Laboratories, Murray Hill, N.J.

[21] Appl. No.: 546,191

[22] Filed: Jun. 28, 1990

[51] Int. Cl.$^5$ .............................. G02B 6/40
[52] U.S. Cl. ......................... 385/54; 385/65
[58] Field of Search ............... 350/96.20, 96.21, 96.22

[56] References Cited

U.S. PATENT DOCUMENTS

| | | | |
|---|---|---|---|
| 3,864,018 | 2/1975 | Miller | 350/96.21 |
| 4,029,390 | 6/1977 | Chinnock et al. | 350/96.22 |
| 4,279,468 | 7/1981 | Turley et al. | 350/96.21 |
| 4,415,232 | 11/1983 | Caron | 350/96.21 |
| 4,657,341 | 4/1987 | Sammueller | 350/96.22 |
| 4,662,713 | 5/1987 | Davies et al. | 350/96.20 |
| 4,772,088 | 9/1988 | Finzel | 350/96.21 |
| 4,778,243 | 10/1988 | Finzel | 350/96.21 |
| 4,784,457 | 11/1988 | Finzel | 350/96.21 |
| 4,818,058 | 4/1989 | Bonanni | 350/96.20 |
| 4,818,059 | 4/1989 | Kakii et al. | 350/96.21 |
| 4,830,456 | 5/1989 | Kakii et al. | 350/96.20 |
| 4,836,638 | 6/1989 | Finzel | 350/96.21 |
| 4,865,413 | 9/1989 | Hübner et al. | 350/96.21 |
| 4,898,449 | 2/1990 | Vroomen et al. | 350/96.21 |
| 4,973,127 | 11/1990 | Cannon, Jr. et al. | 350/96.22 |
| 4,983,012 | 1/1991 | Saito et al. | 350/96.21 |
| 4,998,796 | 3/1991 | Bonanni et al. | 350/96.21 |

FOREIGN PATENT DOCUMENTS 57-205704  12/1982  Japan .

OTHER PUBLICATIONS

"Precisely moulded plastic splices for optical fibers", by Kurokamma, et al., *Electronic Letters*, Nov. 1980, pp. 911-912, vol. 16, No. 24.

"Accurate silicone space chips for an optical fiber cable", by C. M. Schroeder, *Bell System Technical Journal*, Jan. 1978, pp. 91-97.

"Low Loss multifiber connectors with plug guide grooved silicon", by Satake et al., *Electronic Leters*, Nov. 1981, pp. 828-830, vol. 17, No. 22.

"Low-loss plastic molded optical multifiber connector for ribbon-to-single fiber fan out", by Satake et al., *Journal of Lightwave Technology*, Dec. 1985, pp. 1339-1342, vol. LT-3, No. 6.

*Primary Examiner*—Frank Gonzalez
*Attorney, Agent, or Firm*—R. F. Kip, Jr

[57] ABSTRACT

A field assemblable multifiber optical connector has a tubular housing enclosing a passage in which we inserted two plug assemblages having respective butting front end faces butting each other. Each assemblage comprises (a) a plug consisting of two plates spaced by a gap and having on opposite sides of such gap respective registering sets of laterally spaced gooves defining fiber receptacle channels running to such end faces, and respective pairs of longer groves deferring similarly running pin receptacle channels flanking such fiber channels, and (b) a resilient clip coupled to both guide plates to urge them towards each other and maintain them in alignment. Initially, each such assemblage also includes a comb at the back of the plug for aiding insertion of optical fibers into it. The housing also mounts in its passage a pair of aligning pins receivable partly in both one and the other of the plugs in their pin channels. To effect field assembly, the plug assemblages are removed from the housing, fibers from corresponding optic fiber cables are advanced through the fiber channels in the plugs to their end faces, the guide plates of each plug are then bonded together by adhesive, and the plug assemblages are then replaced in the housing with end faces abutting to produce an optical splice between the two sets of fibers, respectively, in the two plugs. The resilient clips of the assemblages are concurrently coupled both to the plugs and to the housing to maintain such end faces in yieldable mutual pressure contact.

13 Claims, 13 Drawing Sheets

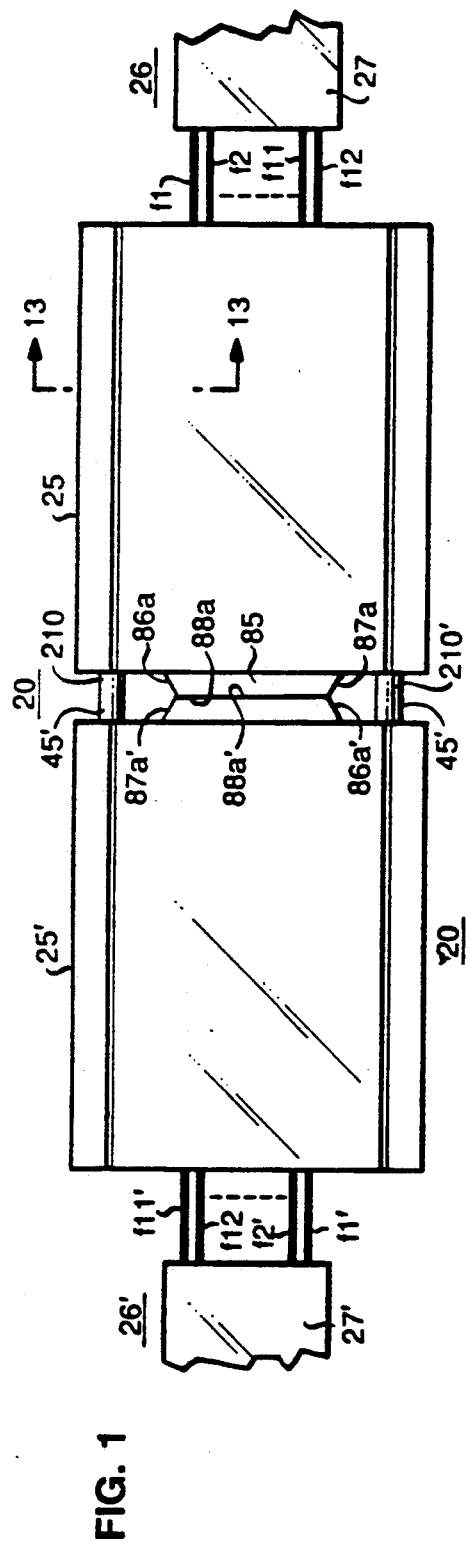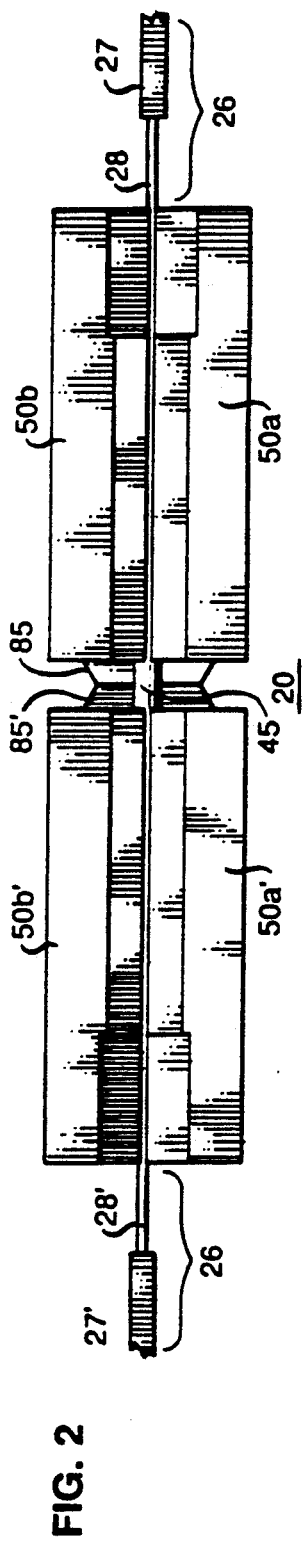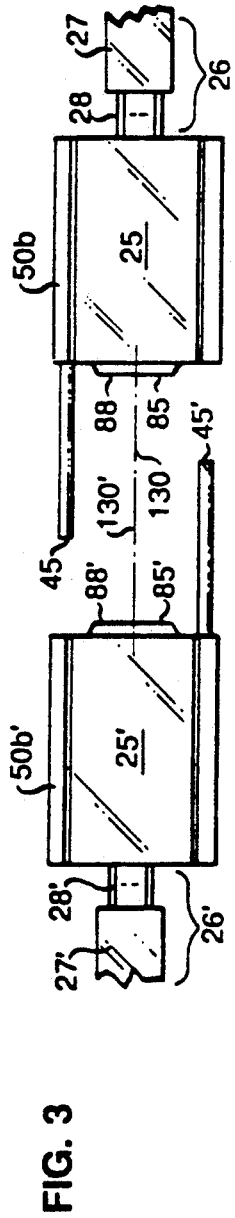
FIG. 1
FIG. 2
FIG. 3

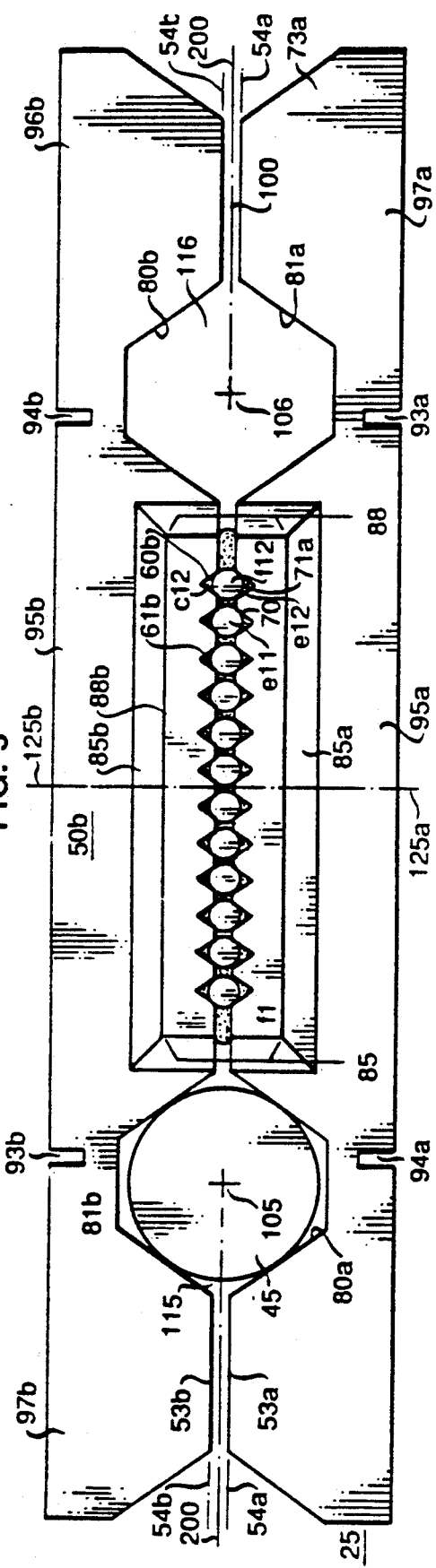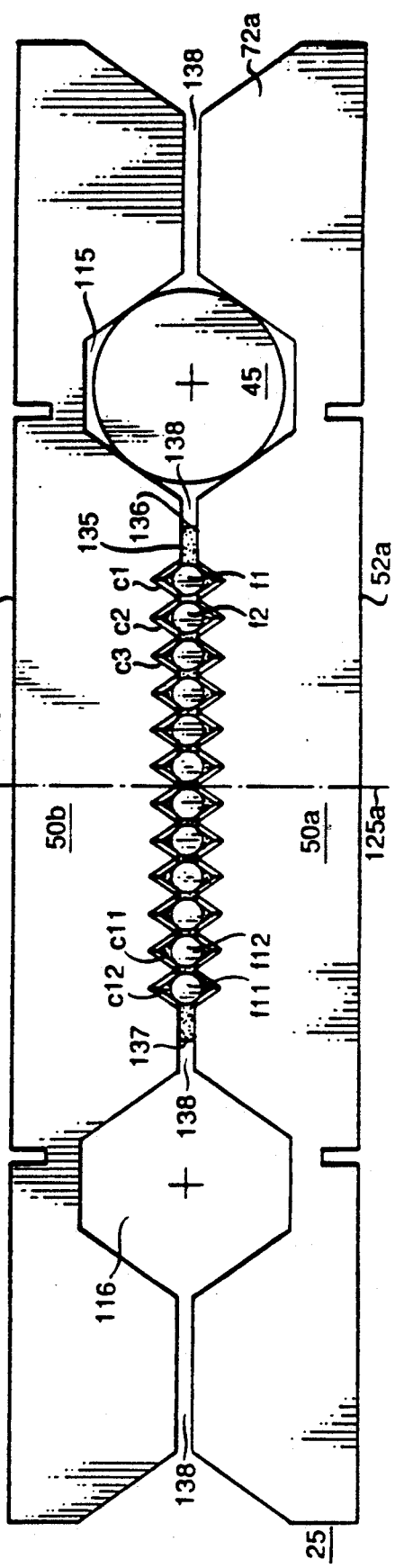

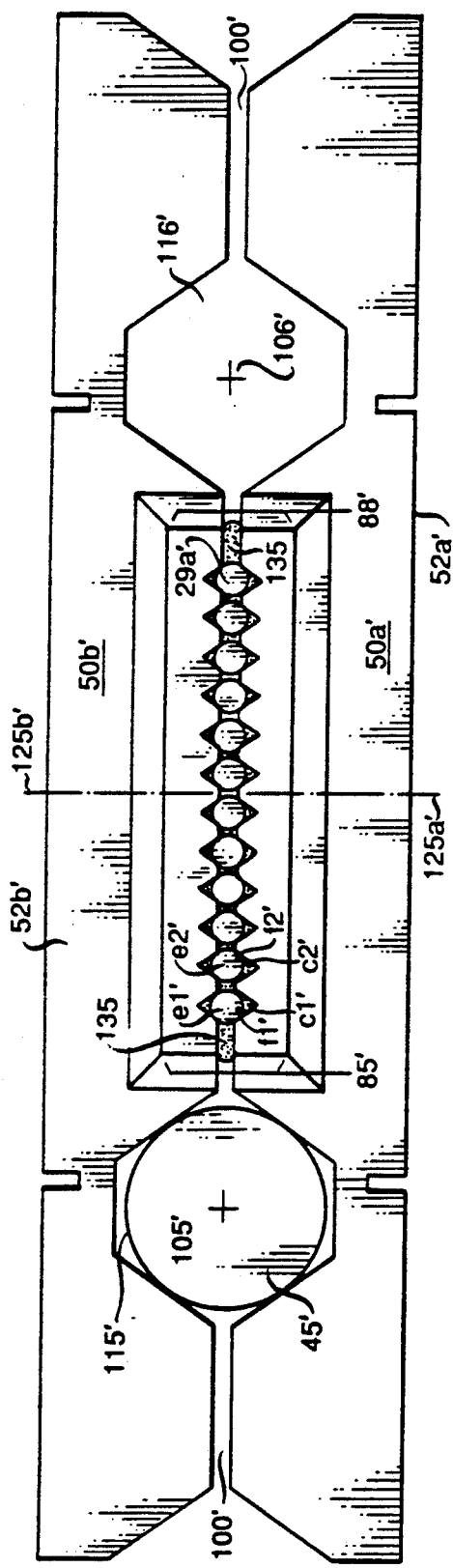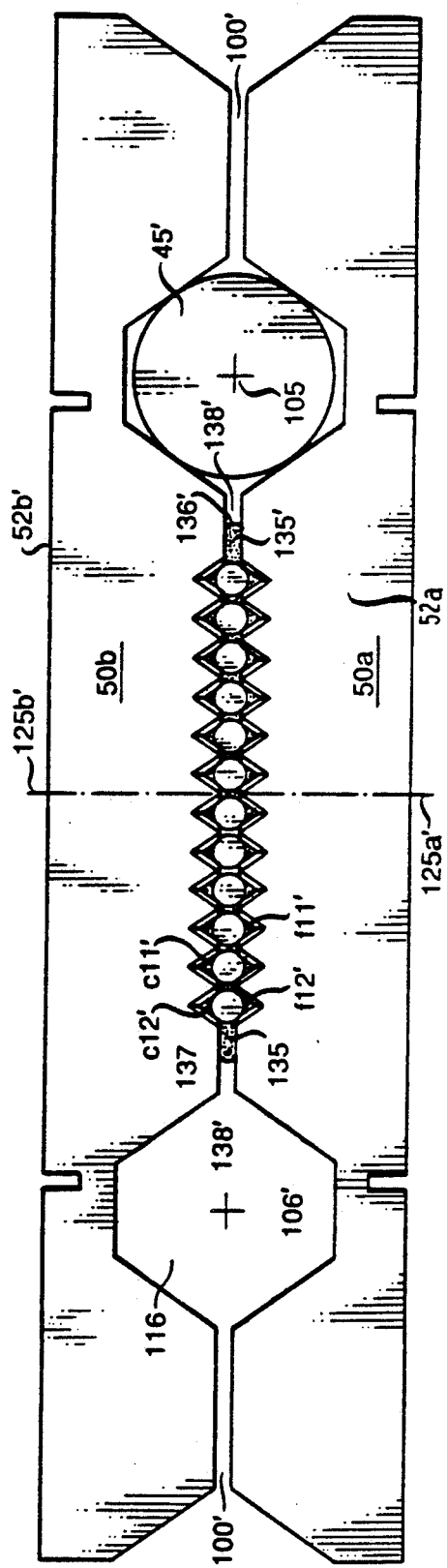

FIELD-ASSEMBLABLE MULTIFIBER OPTICAL CONNECTOR

FIELD OF THE INVENTION

This invention relates generally to optical fiber connectors and, more particularly, to connectors of such kind for providing make-break connections between separate pluralities of optical fibers.

BACKGROUND OF THE INVENTION

In an article, published by C. M. Schroeder on pages 91–97 of the January 1978 issue of the *Bell System Technical Journal* (Vol. 57, No. 1), and entitled "Accurate Silicon Spacer Chips for an Optical Fiber Cable Connector", the author discloses an arrangement for optically splicing two groups of optical fibers by providing for each group a connector comprising a stack of silicon chips. Each chip has on both its sides a set of spaced parallel "V" grooves registering (except for those on the outside stack faces) with the grooves of an adjacent chip to define a plurality of fiber-aligning channels which extend through the stack, and in which channels are received the end sections of the fibers in the corresponding group. The splicing of the fibers in the two groups is effected by butting the two stacks end to end so as to produce as close as possible to an exact alignment between the fibers in one stack and the corresponding fibers in the other.

The mentioned arrangement has been successful in producing optical fiber splices having relatively low loss due to misalignment of the fibers at the splice. The scheme has the deficiencies, however, that, while the use of silicon chips as the carriers for the fiber channel producing "V" grooves permits those grooves to be located on the chip with great accuracy to promote the exact aligning of fibers to be optically spliced, such chips are too costly to lend themselves to extensive commercial use. Moreover such chips are so fragile as to make their use inconvenient in interconnecting optical fibers in the field. Aluminum chips would not have such deficiencies, but the author points out that aluminum chips could not be manufactured repeatedly with the high dimensional accuracy required. Indeed, it is acknowledged in the article that even the silicon chips described therein had thickness variations which were contributions to splice loss.

U.S. patent application, Ser. No. 07/359,453 filed May 31, 1989, now U.S. Pat. No. 4,973,127 in the name Thomas C. Cannon, Jr., Bruce G. LeFevre and Clyde J. Myers (the inventor hereof) and assigned to the assignee hereof, such patent being incorporated by reference herein and made a part hereof, discloses that the aforementioned and other deficiencies can be obviated by providing a two-plug multi-fiber optical connector in which each plug comprises lower and upper synthetic-resinous transversely-spaced juxtaposed guide plates having confronting inner sides in each of which is formed a set of parallel smaller grooves and a pair of larger grooves on laterally opposite sides of that set. The smaller grooves in the two plates of each plug register to define a plurality of channels through that plug in which are received sections of corresponding optical fibers fed into the plug to terminate at ends of the fibers at the front of the plug. A pair of larger grooves in the two plates of each plug likewise register to define a pair of channels in each plug for reception in each channel of an aligning pin. A pair of such pins are, in the use of the connector, inserted with a playless fit partly in such channels of one of such plugs and partly in such channels of the other. The inserted pins align the pair of plugs front-to-front, so precisely that corresponding fiber ends in one and the other of the plugs are optically spliced together with very little loss ensuing at the splice. Because the alignment of the plugs is effected by pins playlessly contacting the plugs at or near their respective transverse center planes at or near which the fiber ends are also located (rather than contacting such plugs at their transversely outer sides), misalignment of the plugs due to variations from normal in the thickness of their plates is avoided, and the transverse alignment between plugs of the ends of the fibers included therein is rendered largely or entirely independent of such thickness variations.

The optical connector which is the subject of the aforementioned Cannon et al patent is, however, disclosed therein as being partly fabricated by the use of a crib fixture employed to implement insertion into each of the two plugs of the connector of the several optical fibers in each of the two groups of such fibers which respectively correspond to, and are terminated by, that plug. Such crib fixture is not, however, well adapted for use in the field. Moreover, in the connector of the Cannon et al patent, the two plugs of the connector are coupled together only through the two aligning pins commonly received therein, and such connector does not include means for preloading the plugs with force operable in the assembled connector to continuously keep the respective fronts of the two plugs in yieldable pressure contact.

SUMMARY OF THE INVENTION

The invention hereof is for optical connectors including one or more features representing improvements over the Cannon et al connector just considered. More specifically, the invention in one of its aspects is for an optical connector plug of the kind above described further comprising mechanical retaining means coupled with the two guide plates of the plug to form a portable durably united assemblage, and having two mutually coupled contact means disposed outwards of, respectively, one and the other of such plates to maintain them superposed and to exert yieldable force thereon urging them towards each other. As later explained herein in more detail, such improved plug promotes assembly in the field of the plug with the group of optical fibers to be terminated thereby.

In another of its aspects, the invention is for an optical connector comprising two plugs for two respective groups of optical fibers to be spliced together, and a pair of aligning pins each received in both plugs to produce alignment in confronting relation with each other of the respective fronts of both plugs, and such connector also comprising the improvement features of: plug retaining means comprising a plurality of tie sections disposed outside the plugs on opposite sides thereof and each overlapping in extent with both plugs and, also, plug securing means coupling both plugs to such tie sections to thereby couple such plugs together.

According to the invention in still others of its aspects, the two plugs of the connector may be received in a common protective housing therefor, the aligning pins may be supported by mounting means therefor separate from the plugs, resilient means may be employed to preload the plugs with force maintaining them in mutual pressure contact, and a comb may be employed to facilitate insertion into a plug of the optical fibers for which the plug provides a termination.

BRIEF DESCRIPTION OF THE DRAWING

For a better understanding of the invention according to its aspects described above and to other aspects thereof, reference is made to the following description of basic and improved embodiments thereof, and to the following drawings wherein:

FIG. 1 is a schematic plan view of a multifiber optical connector exemplary of a basic embodiment to which are related the improvements according to the invention hereof;

FIG. 2 is a schematic front elevation of the FIG. 1 connector;

FIG. 3 is a schematic plan view of the FIG. 1 connector with its left- and right-hand plugs being uncoupled from each other;

FIG. 5 is a left side elevation of such right-hand plug;

FIG. 6 is a right side elevation of such right-hand plug;

FIG. 7 is a right side elevation of the left-hand plug of FIG. 3;

FIG. 8 is a left side elevation of such left-hand plug;

Figure 4:
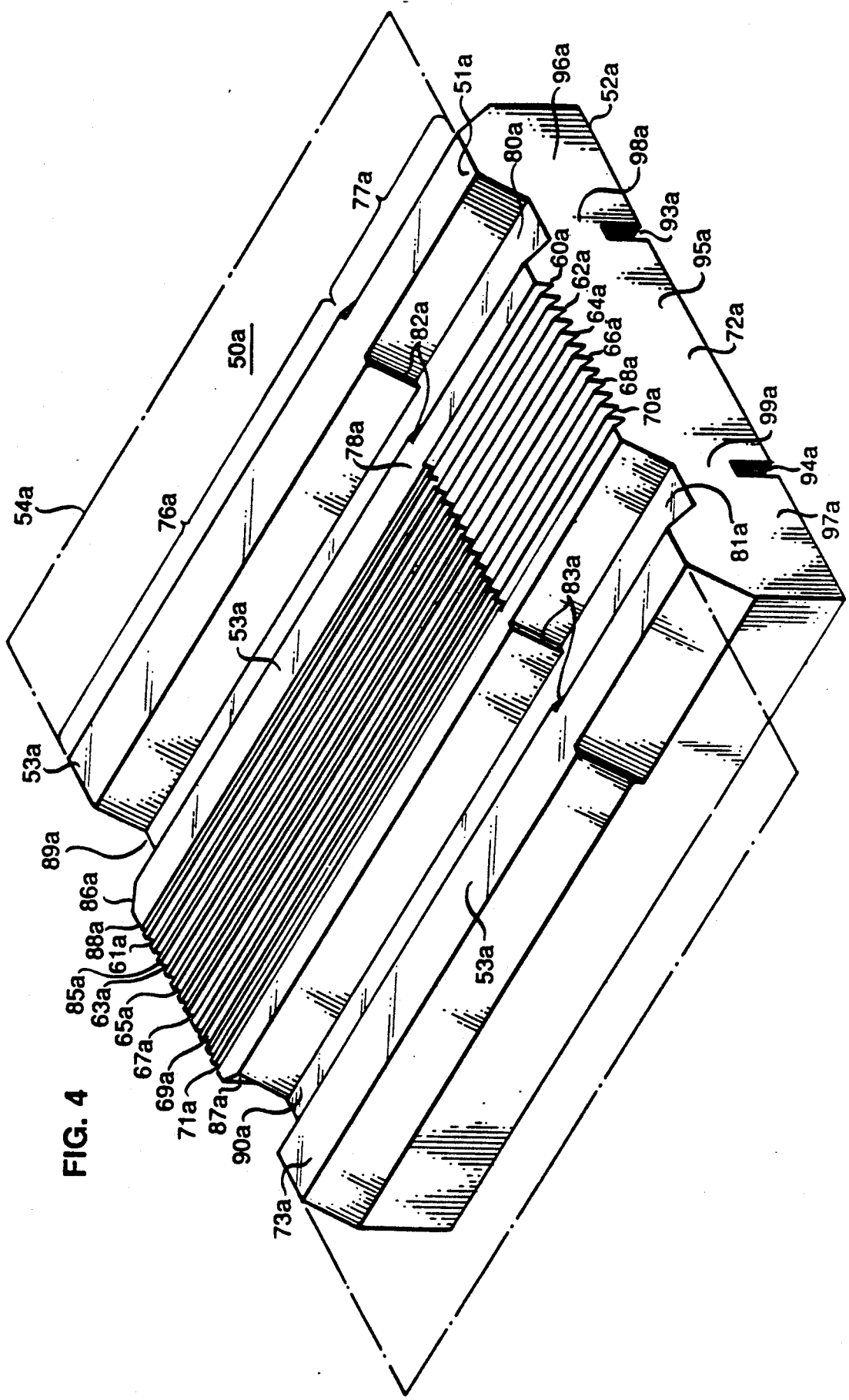
FIG. 4 is an isometric view of a lower guide plate included in the right-hand plug of FIG. 3.

In the description which follows, elements designated by the same reference numbers or letters but by different suffixes for these numbers or letters are counterpart elements, and a description of one such element shall, unless the context otherwise indicates, be deemed to apply similarly to its counterpart(s).

DETAILED DESCRIPTION OF BASIC EMBODIMENT

Referring now to FIG. 1, the reference number 20 designates a multifiber optical connector comprising right- and left-hand plugs 25, 25' constituting respective terminations for separate optical fiber cables 26, 26'. Cable 26 comprises a synthetic resinous ribbon 27 in the body of which are embedded twelve laterally spaced optical fibers f (individually designated f1, f2 . . . f11, f12) of which some are shown in FIG. 1. Cable 26' comprises a similar ribbon 27' in which are embedded similar optical fibers f'. The fibers f and f' each comprise a core and cladding, and may be either single mode or multimode fibers. Lengths of the fibers pass forwardly through their corresponding plugs to terminate in fiber ends exposed at the front surfaces of the plugs.

The two plugs are shown in FIGS. 1 and 2 as being coupled together by a pair of aligning pins 45, 45' each received partly in one plug and partly in the other to form the assembled connector 20. The pins 45, 45' are metal or ceramic pins dimensioned with great precision and having good dimensional stability. Those pins position the plugs relative to each other to produce an accurate alignment of the end of each fiber in plug 25 with the end of the corresponding fiber in plug 25'. The result is a low loss optical splice between the fibers f of cable 26 and their counterpart fibers f' of cable 26'.

The optical interconnection of the two sets of fibers may readily be interrupted by detaching plugs 25 and 25' from each other to become decoupled as shown in FIG. 3. When the plugs are so decoupled, the pins 45 and 45' are shown as remaining in the plugs 25 and 25', respectively. If desired, however, both of the pins may remain in the plug 25 or the plug 25', or both pins may be entirely separated from both plugs. Because the plugs 25 and 25' may selectively be coupled and decoupled, the described connector 20 is a make-break connector well adapted for field use.

Plug 25 comprises lower and upper synthetic resinous guide plates 50a, 50b, plug 25' comprising similar guide plates 50a', 50b'. Plates 50b, 50a', 50b' are duplicates of guide plate 50a of which details are shown in FIG. 4. All such guide plates may be constituted, for example, of glass filled thermoset epoxy such as PLASKON 2929B sold by PLASKON Electronic Materials, a subsidiary of Rohm & Haas Company.

Referring to FIG. 4, plate 50a is a generally rectangular body having inner and outer parallel sides 51a, 52a vertically separated from each other in the transverse or thickness dimension of the plate. Inner side 51a has an upwardly presented face 53a extending longitudinally and laterally in a horizontal inner face plane 54a for such plate. Formed in a laterally central region of such inner side 51a is an array of twelve laterally spaced parallel fiber receptacle grooves 60a–71a extending transversely into the body of plate 50a from its face 53a. Those grooves are all parallel to the longitudinal axis 130 (FIG. 3) of the plate, and they all run from the plate's rear 72a to its front 73a. The grooves are V-sided in the sense that each groove has two laterally separated planar side walls defining two planes which meet at a line of intersection to define a dihedral angle bisected by the plane passing through that line and perpendicular to the face plane 54a. In the fiber grooves of the plate 50a, the mentioned sidewalls of each groove extend all the way down to a common intersection line to render such groove of full "V" configuration in lateral-transverse cross section. However, those sidewalls of such V-sided grooves may, for each, terminate at a flat groove bottom short of such intersection so that the groove is of truncated "V" configuration in cross section. Further, such V-defining sidewalls of such grooves need not reach all the way to the face 53a from which the grooves 60a-71a extend transversely into the plate.

The grooves 60a-71a are divided into respective forward portions and respective rear portions lying in, respectively, a forward interval 76a and a rear interval 77a of the side 51a of the plate 50a. Over the length of the forward portion of each such groove, it is of uniform cross section, and the same is true over the length of its rear portion. However, the rear portion of that groove is larger in cross section than its forward portion. Between the mentioned intervals 76a and 77a is a zone 78a of short length in which the bounding walls of the grooves 60a-71a are tapered to provide faired transitions from their larger cross-section rear portions to their smaller cross-section front portions. The enlarging of the rear parts of the grooves 60a-71a facilitates the inserting therein of the optical fibers f.

The array of fiber grooves 60a-71a is flanked on its laterally opposite sides by a pair of pin receptacle grooves 80a, 81a formed in the inner face 53a of plate 50a and extending longitudinally in that plate from its rear 72a to its front 73a in parallel relation with grooves 60a-71a. The pin grooves in lateral-transverse cross section have a cross-sectional area larger by at least one order of magnitude than that of the fiber grooves. Moreover, while the pin grooves 80a, 81a are V-sided grooves in the sense described above, they have flat bottoms so that they have a truncated "V" cross-sectional configuration rather than one which is a full "V".

Within the rear interval 77a of plate 50a, the pin grooves 80a, 81 have rear portions of slightly enlarged cross sections relative to that of their front portions in interval 76a. In the case of the pin grooves, however, there is no tapered transition between their front and rear portions. Instead at the intersection of those portions, the bounding walls of the grooves 80a, 81a have formed therein rearward-facing shoulders 82a, 83a extending perpendicular to the axes of the grooves and adapted to act as stops.

The plate 50a in its laterally central region has a pedestal 85a projecting forwardly from the surrounding area of the plates front end 73a and having slanted side walls 86a, 87a convergently tapering forwardly to a planar end face 88a for the pedestal. End face 88a is perpendicular to both the plate's inner face plane 54a and its transverse-longitudinal center plane 125a (FIGS. 6 and 7). As shown, the fiber grooves 60a-71a extend forwardly through pedestal 85a to openings thereof included within end face 88a. On the other hand, such end face projects forward of and is laterally inward of the forward terminations 89a, 90a of the pin grooves 80a, 81a.

The outer side 52a of plate 50a has formed therein a pair of slots 93a, 94a extending longitudinally through the plate from its rear 72a to its front 73a. In the lateral dimension, the slots 93a, 94a are disposed adjacent the laterally inward margins of the pin grooves 80a, 81a. The two slots extend transversely into the material of plate 50a to divide it into a central region 95a disposed laterally between the slots, and into two outer regions 96a, 97a outside the slots. The slots 93a, 94a reduce the transverse-longitudinal cross section of the plate transversely inward of the slots so as to form necks 98a, 99a by which central region 95a is connected to the outboard regions 96a and 97a, respectively.

Turning now to FIGS. 5 and 6, the lower guide plate 50a is shown disposed in plug 25 in assembled relation with the upper guide plate 50b so that the two plates are in vertically juxtaposed relation with their respective inner faces 53a, 53b confronting each other and being separated by a transverse gap 100 between those faces.

The two plates moreover are aligned in the lateral direction so that their respective fiber grooves 60a-71a and 60b-71b register with each other across gap 100 to define twelve fiber receptacle channels c (individually designated as c1, c2 . . . c11, c12) extending longitudinally through plug 25. Each such channel comprises (i) a fiber groove in the lower plate, (ii) the fiber groove in the upper plate directly above such lower fiber groove and (iii) the portion of the gap between such two grooves. As exemplified, however, by fiber channel c1, the two grooves 60a and 71b which are components of that channel don't match in their reference numerals. That lack of match is due to the fact that plate 50b, although a duplicate of plate 50a has, from a starting position the same as plate 50a, been rotated 180° about a horizontal axis in the course of positioning plate 50b above plate 50a.

Similarly, the pin grooves 80a, 81a, 80b, 81b of the two plates register with each other across gap 100 to define two pin channels 115 and 116 extending longitudinally through plug 25. Pin channel 115 comprises grooves 80a, 81b and the gap portion between them, while pin channel 116 comprises grooves 81a, 80b and their common gap portion. Channel 115 is shown as having received therein the aligning pin 45. The longitudinal axes 105, 106 of the pin channels 115, 116 are transversely disposed to be within gap 100.

The optical fibers f1 . . . f12 associated with plug 25 (FIG. 1) are received in fiber channels c1 . . . c12, respectively, to extend therein forwardly to planar ends e (individually designated as e1, e2 . . . e11, e12) of such fibers at the front of the plug. Also in these channels are portions of a body 135 (FIG. 6) of adhesive material providing plate retaining means fastening the plates 50a, 50b together in their relative positions shown in FIGS. 5 and 6. The adhesive material of body 135 fills all the space in channels e not occupied by the fibers f to embed the fibers in that material. Moreover, such material fills the lateral portions of gap 100 which lie between adjacent ones of these channels and, also, two short lateral portions of such gap which are outwards of the outside channels c1 and c12. Outwardly, however, of these channels the adhesive body 135 laterally terminates at edges 136, 137 for such body which are laterally inwards of the pin channels 115, 116. Thus the lower and upper plates 50a, 50b are adhesively bonded together only between the edges 136 and 137. Laterally outwards of those edges, the plates remain separated by portions 138 of the gap 100 which are still air gaps.

The pedestals 85a, 85b on guide plates 50a, 50b cooperate to form for the plug 25 a forwardly projecting nose 85 having a planar end face 88 normal to the longitudinal axis 130 of plug 25. Areas of face 88 are provided by the end faces 88a, 88b of the two pedestals, other areas are provided by the exposures (in the plane of that end face) of the adhesive material 135 in gap 100, and still other areas are provided by the exposures (in that plane) of the forward ends e of the optical fibers f.

As indicated by FIGS. 7 and 8, the structure of plug 25' duplicates that of the plug 25. Aligning pin 45' is received in the pin channel 115' of the plug 25'. The nose 85' of that plug has a planar end face 88' normal to the longitudinal axis 130' of plug 25'. Areas of that end face 88' are provided by (i) the end faces 88a', 88b' of the pedestals on the lower and upper guide plates in the plug, (ii) exposures in the plane of that end face of the material of adhesive body 135', and (iii) exposures in that plane of the ends e' of the optic fibers f' received in plug 25'.

FABRICATION OF THE BASIC EMBODIMENT

Figure 9:
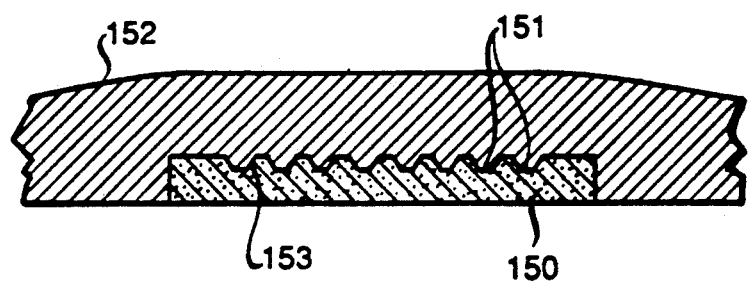
FIG. 9 is a schematic cross-sectional fragmentary view of a manner of forming a mold insert used in fabricating the FIG. 4 guide plate and other guide plates.

In order to obtain by connector 20 a low loss at the optical splice of the fibers f and f'; it is necessary that the groove patterns formed in the guide plates 50a, 50b, 50a', 50b' mate with each other with higher precision than would easily be realizable by machining these plates to form the whole of such patterns. Such machining caused problems and are avoided in fabricating connector 20 by starting (FIG. 9) with a master silicon chip 150 (or several such chips) in which the desired groove pattern 151 can be formed with great accuracy by the use of well known photolithographic techniques. After pattern 151 has been so formed, the chip is clad by electroforming with a thick metallic deposit or "slug" 152 which has formed in its lower face a negative replica 153 of the groove pattern 151 in the chip. Slug 152 is then removed from the chip and machined to convert it into a mold insert.

The insert is subsequently placed in a mold in which the plates 50a, 50b, 50a', 50b' are produced by transfer molding, and in which a positive replica of the original silicon chip groove pattern appears on the inner side of each plate. In such connection, while it is convenient for all the guide plates in a particular connector 20 to be derived form a single silicon chip 150, the groove pattern can be reproduced in silicon with such accuracy that more than one master chip (each with the same groove pattern formed therein) can be used to provide different of the guide plates in the connector. Moreover, in creating the mold insert, those of its portions which do not correspond to the guide plate groove portions used for accurately positioning the fibers and aligning pins (such non-corresponding portions being the parts of slug 152 used to produce the pedestal 85 and the enlarged groove portions at the rear of the guide plate) may be formed by machining rather than being derived from a silicon chip.

For further details on methods for molding plastic replicas of groove patterns originally formed in a silicon chip by the use of an intermediate electroformed metallic negative replica of such pattern, reference is made to Japanese Public Patent Report 6952-H (Document No. 57-205,704) open to the public, Dec. 16, 1982.

The plug 25, for example, is assembled by the use of a crib fixture 160 (FIGS. 10 and 11) comprising a base 161 having upstanding therefrom vertical side walls 162, 163 and vertical front and rear walls 164, 165 with central openings 166, 167 therein. Walls 162–165 define on the upper surface of base 161 a rectangular enclosure within which guide plates 50a, 50b fit with small clearance in relation to such walls.

Figure 11:
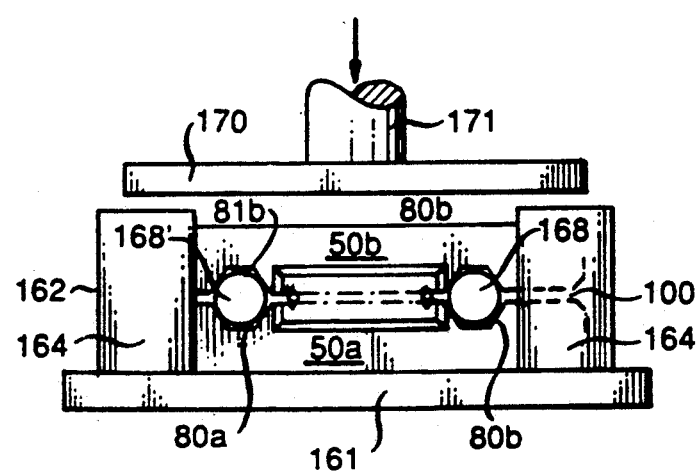
FIG. 11 is a schematic front elevation of the FIG. 10 fixture, and of both guide plates of the right-hand plug received in that fixture.

To start the assembly, guide plate 50a is placed on such surface in such enclosure with the plate's inner face 53a being upward. There is then passed through opening 167 into the pin grooves 80a, 81a, a pair of spacer pins 168, 168' of greater diameter than the aligning pins 45, 45' already described. On top of those pins is next added guide plate 50b (FIG. 11). The presence of the spacer pins between the plates 50a, 50b provides a preliminary alignment in the lateral direction between the grooves in the two plates. Moreover, the insertion of pins 168, 168' (in contrast to pins 45, 45') into the pin channels between those plates serves to increase the size of the transverse gap between them to thereby make easier the insertion of the optical fibers f between the plates.

As a following step, the optical fibers f are inserted into the fiber receptacle channels c and are pushed forward therein until the fiber ends e project slightly beyond the forward terminations of those channels. The spacer pins 168, 168' are then removed, one at a time, from between the plates 50a, 50b. When this is done, plate 50b settles down on the fibers f to be supported above plate 50a by those fibers.

Above guide plate 50b is positioned a horizontal pressure plate 170 fixed to a vertically movable plunger 171 and held thereby so that the lower surface of plate 170 is and remains parallel to the upper surface of base 160 during plunger operation. The downward force exertable by plunger 171 is controllable in magnitude. The plunger 171 is actuated to advance plate 170 in contact with the top of guide plate 50b and then urge it down to press together, with a moderate selected amount of force, the guide plates 50a, 50b and the fibers f therebetween. While the plate assembly is under such force, the material of adhesive body 135 is introduced into the fiber channels c and into gap 100. That is done by applying such material in liquid form to the rear channel openings of the fiber channels so as to cause wicking of the liquid between plates 50a, 50b and ultimate formation of the adhesive body 135 shown in FIGS. 5 and 6. The adhesive material, a thermosetting epoxy for example, is then cured. At the end of the curing period, the adhesive body 135 firmly bonds the guide plates 50a, 50b together in positionally fixed relation, and the assembled plug 25 (with fibers f and ribbon 27 attached) is removed from fixture 160.

Figure 12:
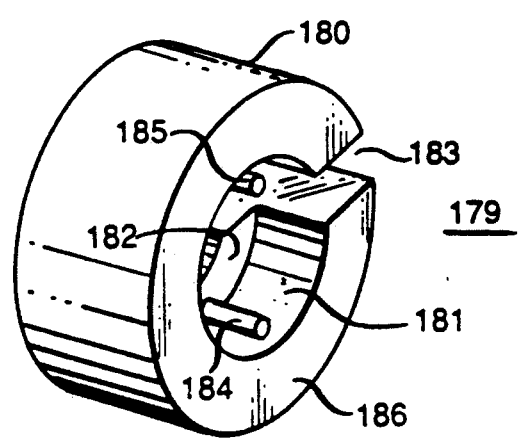
FIG. 12 is a schematic isometric view of a fixture used as an aid in polishing the front end faces of FIG. 3.

FIG. 12 shows a polishing fixture 179 comprising a hollow cylinder 180 with an open top 181 and an annular bottom 182 extending around a circular aperture (not shown) having a diameter greater than the width of ribbon 27 of cable 26 and less than the spacing between the pin channels 115, 116 (FIG. 5). A slot 183 passes radially through the wall of cylinder 180 and extends radially through the bottom 182 therefor from the outside of fixture 179 to the mentioned aperture. Outstanding from such bottoms are a pair of fixture positioning pins 184, 185 on opposite sides of such aperture. Cylinder 180 terminates at its top 181 in a split annular planar end face 186 providing a reference surface.

Fixture 179 is used as follows with the assembled plug 25 and attached ribbon cable 26. Plug 25 is initially positioned out beyond the top of the fixture with cable 26 running past the fixture in alignment with and outside slot 183. The cable is then inserted through the slot into the interior of cylinder 180 so that the cable axially passes through the aperture in bottom 182. Plug 25 is then moved into the interior of fixture 179 so as to advance the fixture's pins 184, 185 into the enlarged rear portions of the pin channels 115, 116 of the plug. Such advance continues until stopped by engagement of the fronts of such pins with the shoulders 82, 83 (FIG. 4) in these channels. Fixture 179 thereby becomes fixed in position relative plug 25.

Once the fixture has been so positioned, its surface 186 defines for the end face 88 of nose 85 of the plug a plane normal to the longitudinal axis 130 of plug 25 or in other words normal to its planes 54 and 105. A sheet of emery or sandpaper (on the planar front side of a backing member therefor, not shown) is used to grind down that end face until further movement of the sandpaper or emery towards the back of the plug is arrested by flat engagement of the abrasive with all parts of fixture surface 186. At this point, the end face 88 of the plug, the ends e of the fibers f therein and the adhesive material 135 at the front of nose 85 will all be in the form of polished areas in the mentioned reference plane. Once such polishing is complete, plug 25 and attached cable 26 are removed from fixture 179.

Plug 25' is made, assembled and polished in like manner to that set out above. The two completed plugs are then coupled and aligned by aligning pins 45, 45' to form connector 20, all as earlier described. Either of such pins may be either removably inserted into the pin channel of the plug by which that pin is carried or, alternatively, may be permanently anchored in that channel by adhesive.

FEATURES OF THE BASIC EMBODIMENT

Further consideration will now be given to features of the connector 20 which contribute to the low loss optical splicing provided thereby.

As used herein, the term "nominal" refers to that positioning, size or other dimensional feature of something which it would actually have if there were no deviation whatever of such positioning, size or other dimensional feature from a numerically specified value therefor.

Good intra-plug alignment in the lateral direction of the lower and upper fiber grooves and pin grooves in the assembled plug 25 (FIGS. 5, 6 and 11) is attainable primarily because of two features. The first is that the groove patterns in the upper and lower guide plates 50b and 50a are duplicates by virtue of being derived from the same groove pattern in the single master silicon chip 150 (FIG. 9) or from being derived from identical groove patterns formed in a plurality of such master silicon chips. The second feature is that the fiber grooves and pin grooves in each of plates 50b and 50a are bilaterally symmetrical in their positioning and dimensioning about the transverse-longitudinal center planes 125b, 125a of such plates.

It is the characterizing of the fiber grooves of such two plates by such two features which enables a good lateral alignment to be obtained in plug 25 between the lower and upper fiber grooves despite the fact that plate 50b (and its groove pattern) must be rotated 180° around a horizontal axes relative to plate 50a (and its groove pattern) in the course of vertical superposing plate 50b (FIGS. 5, 6 and 11) on plate 50a.

Moreover, it is desirable in order to obtain such good lateral alignment of such fiber grooves that the pin grooves of such upper and lower plates also be characterized by such two features. That is so for the following reasons. It is the fact that, upon removal of the spacer pins 168, 168' from between plates 50a, 50b and subsequent application from pressure plate 170 of pressure to those two guide plates (FIG. 11), the lateral alignment ultimately assumed by the upper and lower pin grooves will be determined by the optical fibers f squeezed between these guide plates. Preliminarily, however, the pin grooves should be characterized (to at least an extent) by the mentioned two features in order to prevent the insertion of the spacer pins into the pin channels formed by those pin grooves from laterally misaligning the upper and lower fiber grooves so far that such misalignment would, say, prevent the feeding of the optical fibers into the channels defined between the upper and lower fiber grooves.

Further in respect of the pin grooves, if their actual positioning in the upper and lower guide plates were to depart too much from a bilateral symmetrical positioning thereof, then after plates 50a and 50b were bonded together by adhesive as earlier described (FIGS. 10 and 11), the upper and lower pin grooves might be so laterally misaligned as to fail to define appropriate pin channels between them for insertion of the aligning pins 45, 45'.

Plugs 25 and 25' have differentiated and rear portion thereof in that their fronts have noses thereon while the rear portions have none, the grooves in such portions are enlarged in size at the rear of the plugs as compared to their front size, and so on. In the case, however of plugs which are like 25, 25' but which are longitudinally undifferentiated, the groove patterns in the upper and lower guide plates need not be bilaterally symmetrical. That is so because, even if they are not, by first rotating the upper plate (from a starting position the same as the lower plate) 180° about its vertical axis, then rotating it 180° about its longitudinal (horizontal axis) and then superposing it on the lower plate, the groove patterns in the two plates will still match to permit proper lateral and transverse alignment of the grooves therein. Even in that case, however, the groove patterns in the two plates should be duplicates, and it is still necessary to rotate, as described, the upper plate 180° about its longitudinal axis.

Coming now to the matter of intra-plug transverse alignment, it was earlier described (FIG. 11) that, with the optical fibers f being inserted in their fiber channels c defined by the fiber grooves of plates 50a, 50b, force is applied by elements 170, 171 to such superposed plates and is maintained until such plates have become bonded together by adhesive 135. Both those fiber grooves and and the fibers therein will inevitably have some deviation from nominal in their cross-sectional size. Despite that fact, however, an amount of such force can be (and is) selected to press together plates 50a, 50b to decrease gap 100 between them to the point where, despite such deviations, the respective axes a (individually designated a1, a2 . . .) of all the fibers f lie in a common plane 200. The magnitude of the force needed to provide that result is determinable by trial and error.

Figure 13:
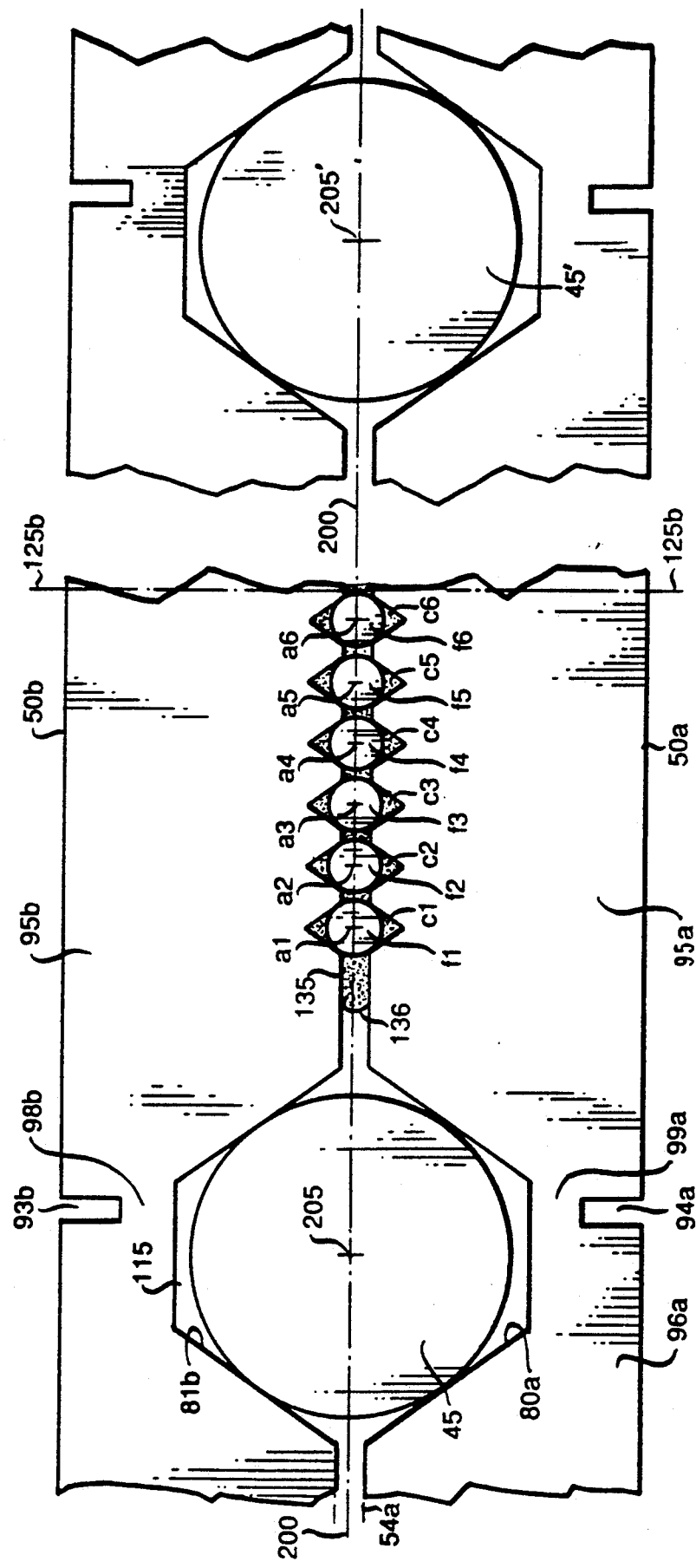
FIG. 13 is an enlarged cross-sectional view, taken as indicated by the arrows (13—13 in FIG. 1) of a portion of the right-hand plug of the FIG. 1 connector.

As shown in FIG. 13, plane 200 is the center plane of gap 100 and is disposed parallel to and midway between the respective face planes 54a, 54b of plates 50a, 50b. The relative cross-sectional sizes of the pin grooves and optical fibers should be chosen so that as taught in U.S. Pat. No. 3,864,018, application of such force does not reduce to zero the size of gap 100. That the axes a of all such fibers can so be made to be in center plane 200 is attributable to various factors such as the duplicate character of the upper and lower fiber grooves of each fiber channel in the plates 50a, 50b, the geometry favorable to that result of squeezing the fibers between pairs of V grooves on opposite sides of the fibers, and the fact that the synthetic resinous material of the plates 50a, 50b is resiliently deformable to yield to accommodate oversize fibers in the fiber channels.

Center plane 200 includes not only the axes of the optical fibers 30–41 but also the axes 205, 205' of the aligning pins 45, 45' when received in the plugs 25 and 25'. The inclusion of such axes in that plane reduces or removes the possibility of transverse misalignment of the plugs 25 and 25' even when plug 25' is positioned "upside down" relative to plug 25. Indeed, the positioning of the alignment pin axes in plane 200 cancels out the transverse misaligning effect of transverse deviations from nominal in the size of the pins and other dimensional features of plug 25. Note however that for such pin axes to be in plane 200, more of the diameter of the pins is required to be in the pin grooves than the fraction of the diameter of the fibers in the fiber grooves.

Plug 25' will of course have the same features as those of plug 25 described above. The incorporation of such features in both plugs results not only for each, in the good "intra-plug" lateral and transverse alignment which have been considered but also in good "extra-plug" lateral, transverse and angular alignments between the two plugs when coupled together.

The aligning pins 45, 45' are oversize in the sense that they are of such diameter in relation to the cross-sectional size of their pin channels 115, 116 in plug 25 and 115', 116' in plug 25' that the pins cannot be frictionlessly slid into such channels. Instead the pins must be forced into such channels and are received therein with a playless fit. This could be done even if such channels were in the form of circular holes continuously surrounded around their peripheries by the material of the plug in which formed. The cost, however, of such would be that, with a deviation type increase in the diameter of the pin, the force needed advance the pin into the channel would rise very rapidly.

That problem is avoided in the plugs 25, 25' by having their pin channels defined by grooves formed in sections 96, 97 of the plugs which are laterally outward of the adhesive body 135 and are thus free to resiliently deform towards or away from each other to vary the transverse size of the pin channel. An example of such a pin channel is the channel 115 (FIG. 3) defined between the grooves 80a, 81b in, respectively, the outboard portions 96a, 97b of the guide plates 50a, 50b of plug 25. Those portions act as short deflectable cantilever beams, and the stiffness of such beams to resilient deflection is reduced by the necks 99a, 99b of reduced cross section by which such beams are joined to the laterally central regions 95a, 95b of those plates. Because resilient deformation of one or both of these portions 96, 97 permits varying the transverse size of pin channel 115 without the creation of undue stress, aligning pin 45 can readily be made sufficiently oversize to absorb, say, variations in the size of gap 100 (caused by deviation from nominal in the optical fibers f in the plug) or thermal variations in the diameter of the pin itself without becoming loose in the pin channel.

Another advantage of the resiliently deformable plate portions 96, 97 is that, when they are resiliently deformed towards or away from each other as a result of variations in the diameter of the aligning pin inserted into or removed from the channel 115, the two portions will deflect symmetrically relative to the center plane 200. In consequence, the axis 205 of pin 45 will remain in such plane unaffected by such resilient deformation responsive to such variations. Similarly the axes 105, 106 of pin channels 115 and 116 (FIG. 5) will be in and stay in plane 200 at all times despite any such variations.

What has just been said regarding resilient deformability applies to plug 25' and pin 45' as well as to plug 25 and pin 45.

Some advantages will now be considered of the noses 85, 85' on the plug 25, 25' and the end faces 88, 88' on these plugs. These end faces are smaller in area than the whole cross-sectional size, at their front ends, of plugs 25 and 25'. Thus, end faces 88, 88' are easier to polish and to render normal to the plug axes 130, 130' than would be the case for a front surface extending over the whole of such front ends.

Another benefit derived from having such noses 85, 85' is that when plugs 25, 25' are coupled together (FIG. 1), portions 210, 210' of the aligning pins are left exposed between the plugs 25, 25' to not be received in the pin channels of such plugs. For the pins to have such exposed portions is advantageous because, if necessary, they are free to deflect over the lengths of such portions to accommodate any difference in the respective lateral spacings in plugs 25 and 25' of the pin channels therein. Moreover, each such exposed portion may be made either incrementally shorter or incrementally longer in the event it is found desirable to incrementally change the angular position of one of plugs 25, 25' relative to the other.

The connector 20 described above is adapted to splice optical fibers with a mean loss of less than 0.3 dB and a stability within 0.1 dB between −40° C. to 85° C.

DETAILED DESCRIPTION OF IMPROVED EMBODIMENT

FIGS. 14–19 are views of an embodiment which is improved according to the invention in relation to the basic embodiment previously described. In FIGS. 14–17, the reference numeral 300 designates a plug retaining means in the form of a molded plastic protective tubular housing for the plugs 25, 25' and the aligning pins 45, 45' of the FIG. 1 optical connector.

The housing 300 has therein a horizontal passage 301 of generally rectangular lateral-transverse cross section. Passage 301 extends through the housing between longitudinally opposite passage openings 302, 303 in the housing.

The housing 300 is fabricated from upper and lower molded plastic sections 305, 306 defining upper and lower halves of the passage 301. Sections 305 and 306 have at their bottom and top, respectively, downward-facing and upward-facing surfaces engaging each other at an interface 307 between the sections. As later described more fully, housing sections 305, 306 are adapted to act as tie sections.

The lower housing section 306 has thereon a pair of flanges 310, 311 integral with the rest of the section and disposed at the lateral-transverse midplane 312 of housing 300. Upper housing section 305 has matching flanges (not shown). The flanges of the two sections may be used to help mount the housing 300 as, for example, by passing fastening screws (not shown) through the flanges and into a support member for the housing.

Another feature of lower housing section 306 is that it contains a pair of "T" slots 315, 316 formed in the course of molding the section and extending at the longitudinal center of passage 301 laterally into the section from the laterally opposite bounding sides of the passage. In the vertical direction, slots 315, 316 extend from the top of section 306 downward and only partly through the section to terminate in blind ends for the slots. Upper housing section 305 has formed therein similar blind-ended "T" slots (not shown) registering with the lower slots 315, 316 and extending from the bottom of section 305 up into the section to form continuations of the lower T-slots in section 306.

Received into the lower T-slots 315, 316 and their matching upper T-slots are a pair of metallic pin mounting brackets 317, 318 having "T" shaped bases received in the backs of such slots and stems extending from such bases laterally through the slots to project from the laterally opposite walls of passage 301 outward into the passage. At their front ends, the bracket stems are pierced by circular cylindrical holes or bores 323, 324 passing horizontally through the stems.

The aligning pins 45, 45' for the optical converter are forced into these holes so that the longitudinal centers of the pins register with those of the holes. The results is that each of these pins has two segments projecting in longitudinally opposite directions horizontally outward from the associated brackets. The friction fit between each pin and its bracket is tight enough to normally maintain these two elements in fixed relative position. If desired, however, such frictional coupling of the pins and brackets may be supplemented by welding, brazing or soldering the pins to the brackets.

The housing 300, brackets 317, 318 and pins 45, 45' are assembled as follows. With the pins and brackets having been mutually coupled as described and with the lower housing section 306 being supported so that its top is upward, the brackets 317, 318 are lowered into the slots 315, 316 so that the lower halves of those brackets are received in such slots. Next, the upper housing section 305 is placed over the lower one so that the upper halves of the brackets are received in the T-slots in the upper section. At that time, the bottom of upper section 305 registers and engages at interface 307 with the top of section 306. The two plastic sections are then integrally joined together at that interface by ultrasonic bonding.

Housing 300 is thereby made a single piece, and the pins mounting brackets 317, 318 are locked into the housing to secure the pins 45, 45' thereto. Those brackets have, however, a somewhat loose fit within the "T" slots which contain them. Accordingly, the coupling between the housing 300 and the pins 45, 45' accommodates a slight amount of play of the pins within the passage 300.

In the improved embodiment, the pins 45, 45' have the shown convergently tapered tips 325, 326, 325', 326' at their ends.

The interface 307 of the housing sections 305, 306 coincides with the ridge lines of four horizontal guide ribs 330, 331, 332, 333 disposed in passage 301 and salient from its laterally opposite bounding walls. The ribs 330-333 are convergently tapered in their directions of projection into passage 301 so as to have lateral-transverse cross sections in the form of "V's" with the vertices of the "V's" corresponding to the mentioned ridge lines.

Figure 18:
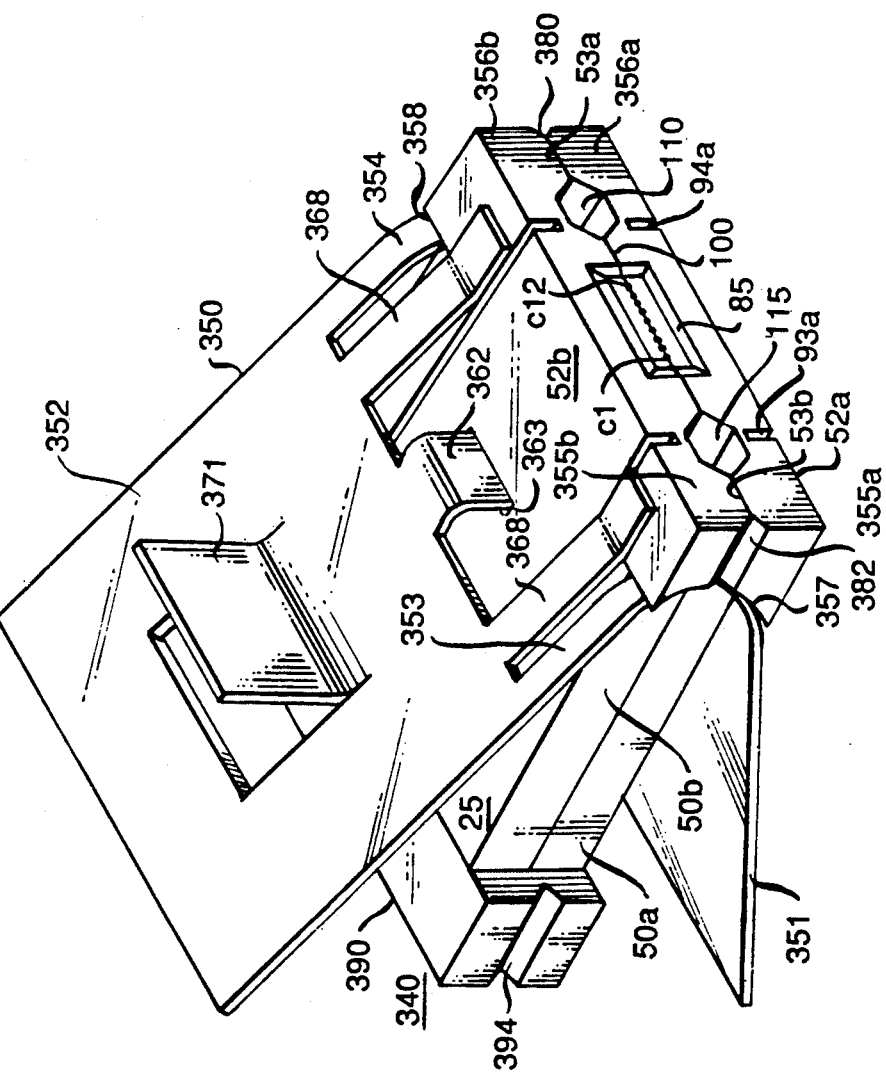
FIG. 18 is an isometric view of the left-hand plug of the FIG. 14 embodiment when separated therefrom.
Figure 19:
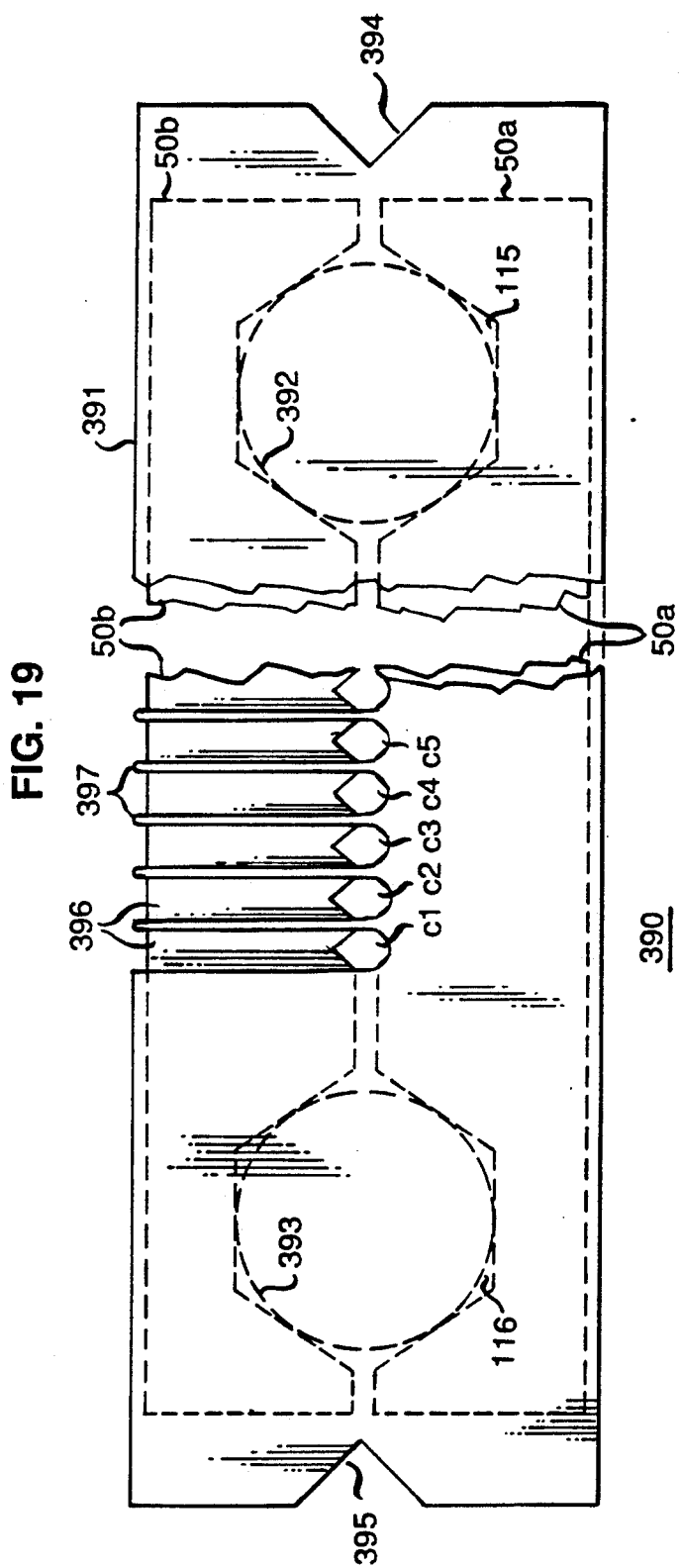
FIG. 19 is a rear elevation of the FIG. 18 plug showing details of the comb component thereof.

Inserted into the left- and right-hand openings 302 and 303 in the housing 300 are left- and right-hand plug assemblages (FIGS. 14 and 15) which are improved versions of the plugs of the FIG. 1 optical connector, and of which details of the left-hand improved plug assemblage are shown in FIG. 18. Referring to that figure, the improved plug assemblage 340 comprises the plug 25 used in the FIG. 1 optical connector and constituted of the lower and upper guide plates 50a and 50b. Assemblage 340 further comprises, however, a mechanical plate retaining means including mutually coupled lower and upper contact means disposed transversely outward of plates 50a and 50b, respectively, and engaging these plates to maintain them transversely superposed and to exert yieldable force thereon urging them towards each other. As shown, such plate retaining means may conveniently take the form of a resilient clip 350 which may be made from a single strip of resilient sheet metal appropriately stamped and otherwise worked to provide the various component parts of the clip.

Clip 350 comprises lower and upper tabs 351 and 352 transversely outward of, respectively, the outer surfaces 52a, 52b of the guide plates 50a, 50b. The clip also comprises a pair of U-shaped resilient deflection springs 353, 354 passing on laterally opposite sides of plug 25 between the tabs 351 and 352 to join them together and render them transversely deflectable. Springs 353, 354 extend from their junctions with tabs 351, 352 longitudinally forward towards the front of the plug 25 such that the nearest approach to the front end of the plug is made by the springs 353, 354 at the mid-regions of the "U" shapes defined thereby. Ahead of these springs the guide plates 50a, 50b are enlarged on their laterally opposite sides to include stubs 355a, 355b, 356a, 356b laterally salient from the main body of the plates and providing backward-facing shoulders 357, 358. Those shoulders provide seats for, and are engaged by, the central regions of the clip springs 353, 354.

The tabs 351 and 352 carry the clip parts which contact the outer surfaces of the lower and upper guide plates 50a and 50b. To wit, tab 351 has integral therewith (FIG. 15) an inwardly turned aligning finger 360 having a tip of lateral-longitudinal rectangular cross section received with a close fit in a notch 361 of lateral-longitudinal rectangular cross section extending into plate 50a from its outside surface 52a. The upper tab 352 has a similar aligning finger 362 of which the rectangular cross-sectioned tip is received with a close fit in a rectangular cross-sectioned notch 363 extending into guide plate 506 from its outside surface 526. Because of the close fit in the lateral-longitudinal plane between fingers 360, 362 and their receptacle notches 361, 362, these fingers tend to maintain plates 50a, 50b in translational and angular alignment in the lateral and longitudinal dimensions. Also, fingers 360, 362 are the principal transmitters to the plates 50a, 50b from clip 350 of the transversely directed forces urging the plates towards each other.

To distribute such forces more evenly over the outer sides of plates 50a, 50b, and to inhibit angular tilting of such plates about the pivots provided by the tips of fingers 360, 362, those aligning fingers are supplemented by pairs of stabilizing fingers 367, 368. The latter fingers are integral with, respectively, tabs 351, 352 and extend from the main parts of such tabs towards plates 50a, 50b to flatly engage with the outside surfaces 52a, 52b of such plates at positions offset from the notches 361, 363.

The tabs 351, 352 carry not only fingers 360, 362, 367, 368 but also two outwardly turned lugs 370, 371 respective to those tabs. Lugs 370, 371 have tips adapted to be received in corresponding notches 372, 373 formed in the bottom and top walls of the passage 301 in housing 300. Lugs 370, 371 on their back sides have arcuate wedging surfaces (FIG. 15) 374, 375 slanting transversely outward and longitudinally forward and adapted to engage with corresponding arcuate wedging surfaces 376, 377 of corresponding slant on the rear sides of the notches 373, 374. As later explained in more detail, the lug wedging surfaces are adapted to cooperate with such wedging surfaces of such notches to produce preloading of plug 25.

The portions adjacent interface 307 on the laterally outer sides of the forward stubs 355a, 355b of guide plates 50a, 50b are chamfered to define a "V" shaped guide groove 382 adapted to contain in loose fitting relation the horizontal "V" rib 332 (FIG. 14) on the inside of passage 301. Stubs 356a, 356 of those plates define a similar "U" groove 380 adapted to contain in loose fitted relation the "V" rib 330 in that passage.

The plug 25 has attached to the back thereof a comb 390. Such comb comprises a plastic block 391 from which are salient a pair of comb mounting pins 392, 393 received into the enlarged rear sections of the pin channels 115, 116 defined between the guide plates 50a, 50b. Mounting pins 392, 393 have diameters to space guide plates 50a, 50b apart by the same amount as do the earlier mentioned spacer pins 168, 168'. Block 391 is enlarged to project laterally outward of guide plates 50a, 50b on both of their laterally opposite sides. The laterally spaced vertical sides of comb block 391 have formed therein respective "V" grooves 394, 395 adapted to respectively contain in loose fitting relation the aforedescribed "V" ribs 332 and 330 in the passage 301 in housing 300.

The comb block 391 has formed therein a set of laterally spaced guide slots 396 extending longitudinally through the block and down from the top of the block (FIG. 19) to the bottoms of the rear entries of the fiber channels extending through plug 25. Slots 396 alternate in comb block 391 with comb teeth 397 intervening and defining the slots.

Figure 14:
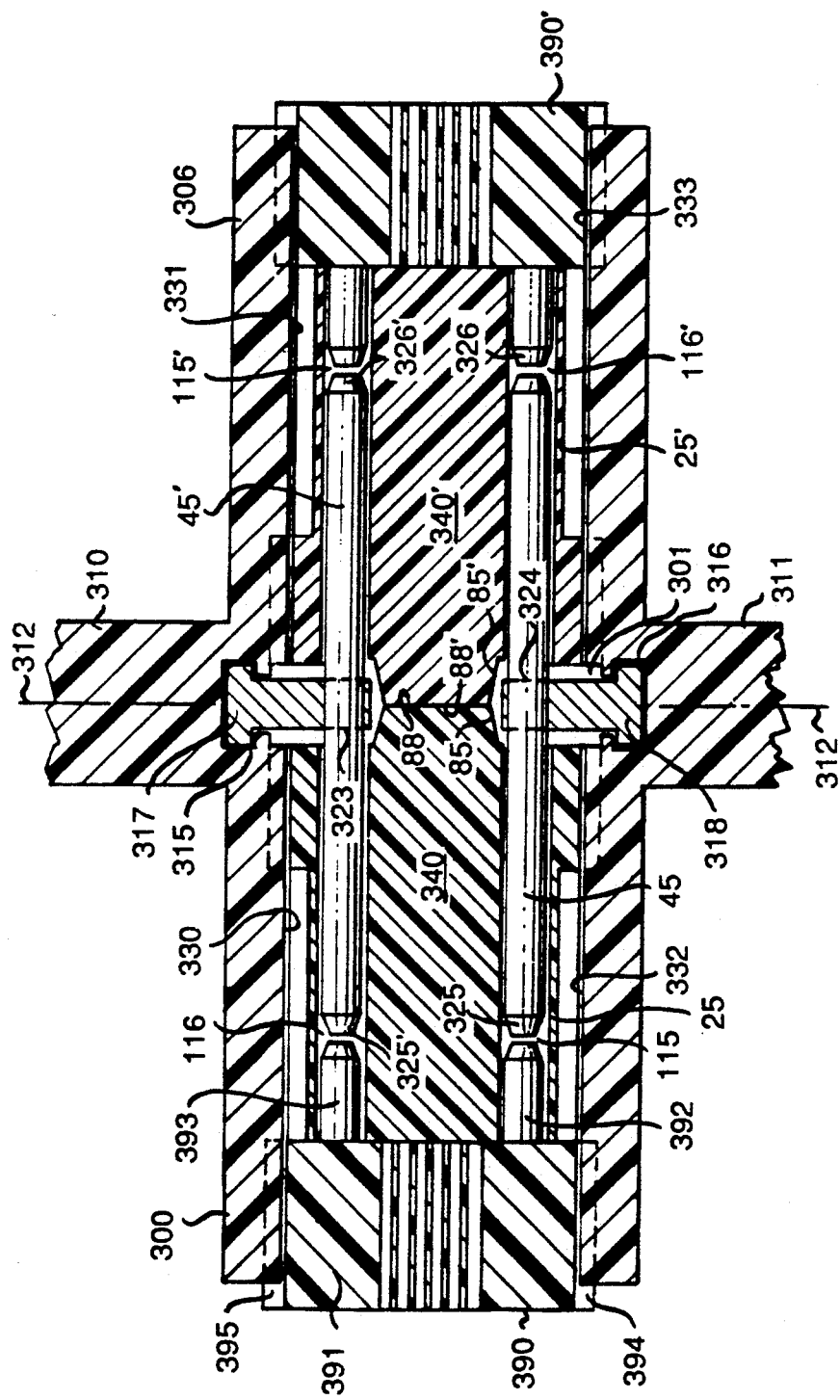
FIG. 14 is a schematic plan view in cross-section of an embodiment according to the invention which comprises the FIG. 1 connector (shown in FIG. 14 as rotated 180° about at vertical axis from its FIG. 1 position) as modified to incorporate therein various improvement features (the "improved embodiment")
Figure 15:
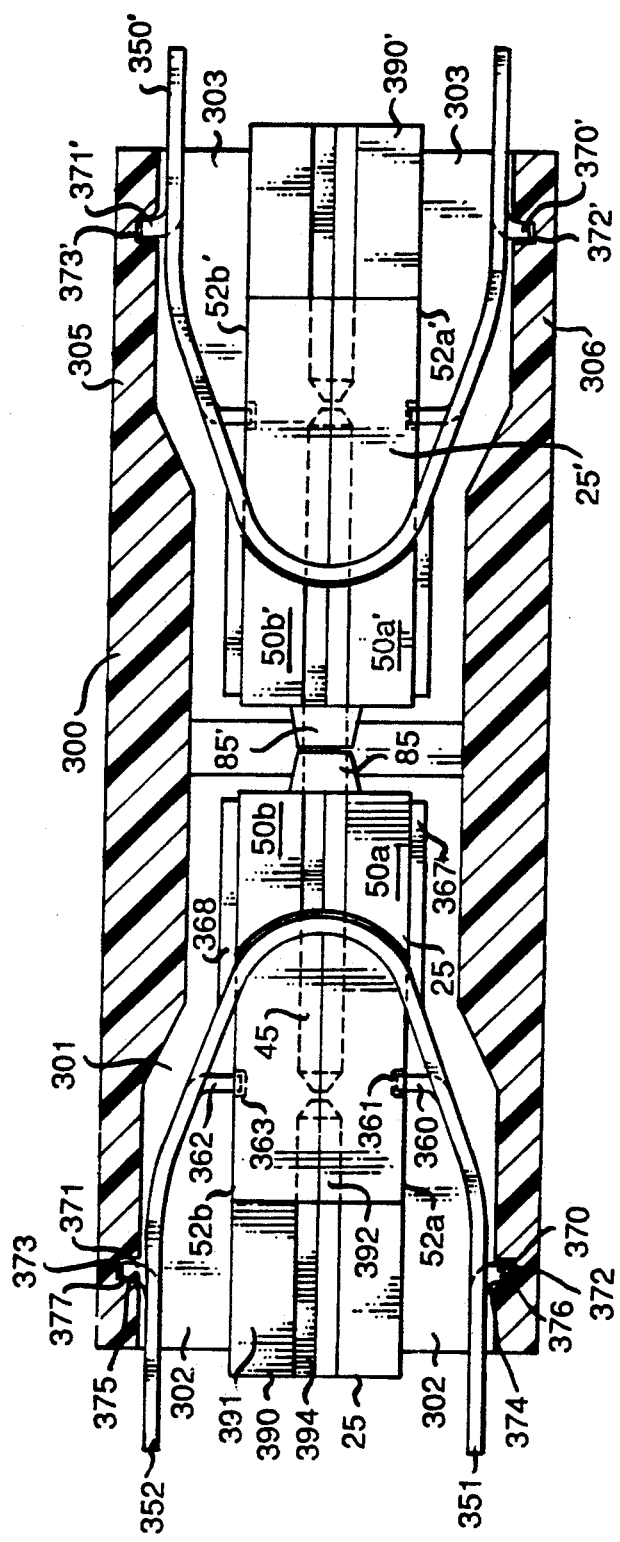
FIG. 15 is a schematic front elevation in cross section of the FIG. 14 embodiment.
Figure 16:
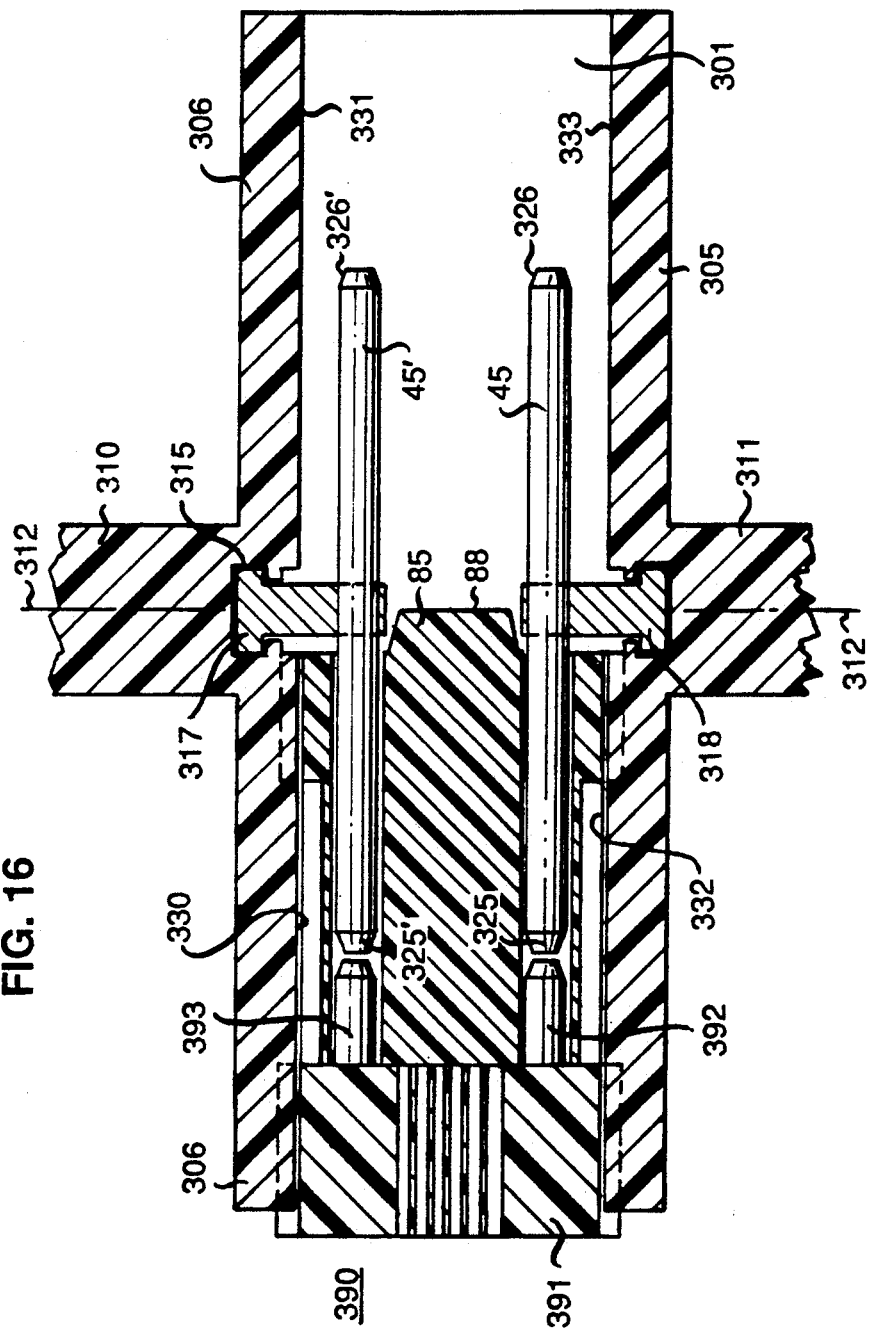
FIG. 16 is a schematic plan view in cross section of the FIG. 14 embodiment with the right-hand plug thereof removed.
Figure 17:
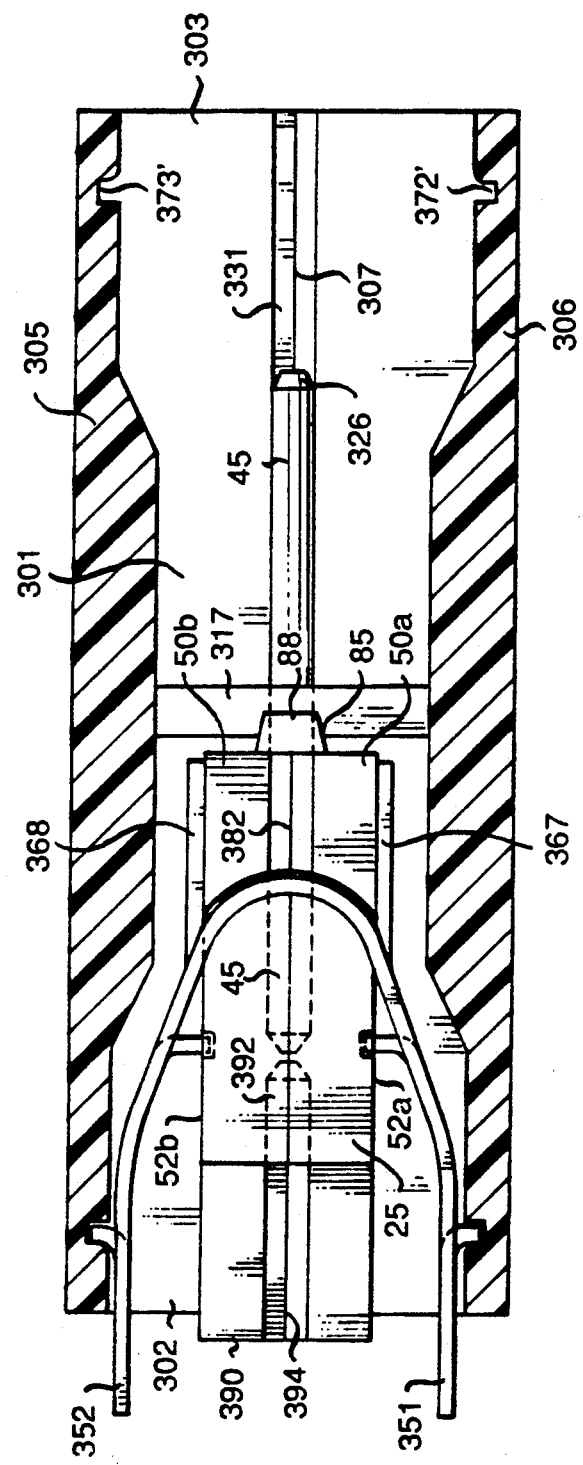
FIG. 17 is a schematic front elevation in cross section of the FIG. 14 embodiment with the right-hand plug thereof removed.

The left-hand plug assemblage 340 is accompanied in the improved embodiment by a counterpart right-hand plug assemblage 340' inserted through right-hand opening 303 in housing 300 to be received and retained in passage 300. Plug assemblage 340' comprises the plug 25' of the FIG. 1 optical connector and, in addition, the resilient clip 350', and the comb 390'. The right-hand assemblage 340' is similar in all respects to the left-hand assemblage 340 to be fully interchangeable therewith. As shown in FIGS. 14 and 15, however, the two plug assemblages are positioned in mirror image relation with each other within the housing.

USE OF THE IMPROVED EMBODIMENT

FIGS. 14 and 15 show the improved optical connector at a time prior to its being put into use to splice the optical fibers respectfully contained in the ribbon cables 27 and 27' (FIG. 1). At that preliminary stage in the use of the connector, the guide plates 50a, 50b of left-hand plug 25 are longitudinally retained in passage 301 of housing 300 by resilient clip 350 by virtue of its lugs 370, 371 being received in notches 372, 373 in the left parts of housing sections 306, 305, and by virtue also of the clip fingers 360, 362 being received in the notches 361, 363 in the plates 50a, 50b of the plug. The plug assemblage 340 is further laterally and transversely maintained and stabilized in its shown positioning (FIG. 15) in passage 301 by virtue of the guide ribs 330 and 332 in the passage by received in, respectively, the guide grooves 380, 395 and the guide grooves 382, 394 of the assemblage. Right-hand plug 25' is analogously longitudinally retained and laterally and transversely positioned in passage 301. In the view afforded by FIG. 14 of the improved optical connector pre-use condition, the noses 85 and 85' of the plugs 25, 25' are, for clarity of illustration, shown spaced apart by a small gap. In practice, however, such noses at that time butt each other.

The FIG. 14 pre-use connector assemblage when in the field affords the advantages that its plugs 25, 25' and pins 45, 45' are shielded from damage and inadvertent misalignment by being enclosed in protective housing 300. Further, all components of the connector are brought together to one place and durably united in the assemblage so that individual components need not be later searched for, and so that they will not be accidentally left behind when it becomes necessary to transport the group of components. Still further, the retaining of such plugs and pins in housing 300 which is in turn fastenable to a building (or other support means) is a feature which permits the connector to be firmly anchored in place instead of being loose. Such fixing of the locating of the connector avoids any risk that damage may be done, by casual shifting of the connector, to the optical splice provided thereby of the optical fibers in the ribbons 27, 27'.

Another advantage of the FIG. 14 and FIG. 15 connector is that it promotes the making of such optical splice in the field as follows: As a first step, the tabs 351, 352 (FIG. 15) of clip 350 of plug assemblage 340 are manually squeezed together enough to release clip lugs 370, 371 from housing notches 371, 373, with such tabs remaining so squeezed, the assemblage is withdrawn by hand from housing 300. Plug assemblage 340' is similarly withdrawn at that time from the housing.

Turning to FIG. 18 which shows plug assemblage 340 when out of the housing, the various components of that assemblage are preliminarily combined as follows: First, the guide plates 50a, 50b are positioned in their shown vertically superposed relation with the inner grooved sides of the plates confronting each other. Next, with comb 390 being absent, resilient clip 350 is slipped over the superposed plates by advancing the clip from the rear towards the front of the plates, with the clip's deflection springs 353, 354 first passing such rear then straddling the plates in moving toward the front. When clip fingers 360 (FIG. 15) and 362 arrive at such rear, tabs 351 and 352 are transversely deflected away from each other to permit these fingers to ride over the outside surfaces 52a, 52b of the plates and to put the previously unstrained clip under resilient strain by such deflection. For that deflection of tabs 351, 352, the V-shaped spring parts 353, 354 of the clip act as tension springs.

Fingers 360 and 362 ultimately reach their respective notches 361, 363 in the plates 50a, 50b and are snapped into these notches by the forces exerted on these fingers by the resiliently strained springs 353, 354. Concurrently with such fingers entering such notches, the forward mid-regions of springs 353, 354 become seated against the backward facing shoulders 357, 358 on plug 25. Comb 390 is then attached to the back of plug 25 by inserting the comb's mounting pins 392, 393 into the rear sections of the pin channels 115, 116 between the guide plates 50a, 50b. With such mounting of the comb to the rear of the plug, the assembling of device 340 is complete.

In the completed assemblage 340, the guide plates 50a, 50b are urged towards each other by the resilient force of clip 350 acting through its tabs 351, 352 and their fingers 360, 362, 367, 368. At their back ends, the plates are kept transversely spaced apart by the pins 392, 393 of comb 390, and the force from clip 350 acts upon these pins to frictionally hold them within pin channels 115, 116 to thereby maintain comb 390 secured to the plug 25. As earlier described, the plates 50a, 50b of the plug are individually maintained in translational and angular alignment in the lateral and longitudinal dimensions by the close fit of clip fingers 360, 362 in their respective notches or indentations 361, 363 in the outside surfaces of these plates. Also, the plates 50a, 50b are precluded from being laterally or longitudinally offset from each other by the cooperation of clip 350 with both those plates or, more specifically, by the close-fit reception of clip fingers 360, 362 in their notches in the plates and by the positioning of the clip springs 353, 354 adjacent the lateral sides of the plates and the seating of such springs against the shoulders 357, 358 in the plates. The clip 350 therefore causes assemblage 340 to be durably united in the sense that all of its components 50, 50b, 350 and 390 will remain together unless deliberate effort is taken to separate them. To have such stable unity of its parts makes the plug device 340 very conveniently portable.

The plug 25 in device 340 is assembled in the field with the optical fibers f of ribbon cable 27 in the following manner. The spacer pins 168, 168′ (which have been previously described in connection with the FIG. 10 crib fixture) are placed in the front openings in the pin channels 115, 116 in plug 25 and are advanced into those channels until these pins about reach the mounting pins 392, 393 of the comb 390. The effect of the positioning of the spacer pins in these channels is (as in the case of their use in the FIG. 10 fixture) to increase at the front of plates 50a, 50b the size of the transverse gap between them to thereby make easier the insertion of the optical fibers f between the plates. As earlier stated, the comb mounting pins 392, 393 are greater enough in diameter than the spacer pins so as, when inserted into the enlarged rear sections of the pin channels, to increase the size of such gap by the same amount as does the insertion of the spacer pins into the front parts of such channels. Hence, the advancing of the spacer pins in between plates 50a, 50b does not cause them to lose all frictional grip on the comb pins 392, 393 to thereby let the comb casually separate from the plug 25.

After the spacer pins have been placed in the pin channels 115, 116 of the plug, the fibers f from cable 27 are laid into the guide slots 396 in the comb 390. These guide slots position each fiber f so that its front end is in lateral and transverse alignment with the center of the rear entry opening of the corresponding one of the fiber receptacle channels c in the plug 25. It follows that the fibers f usually can be simultaneously introduced into such channels by merely advancing ribbon cable 27 as a whole towards the back of the plug. The use of comb 390 thus aids in dealing with the "eye-of-needle" problem of threading a whole group of fibers into a group of respective openings therefor.

Figure 10:
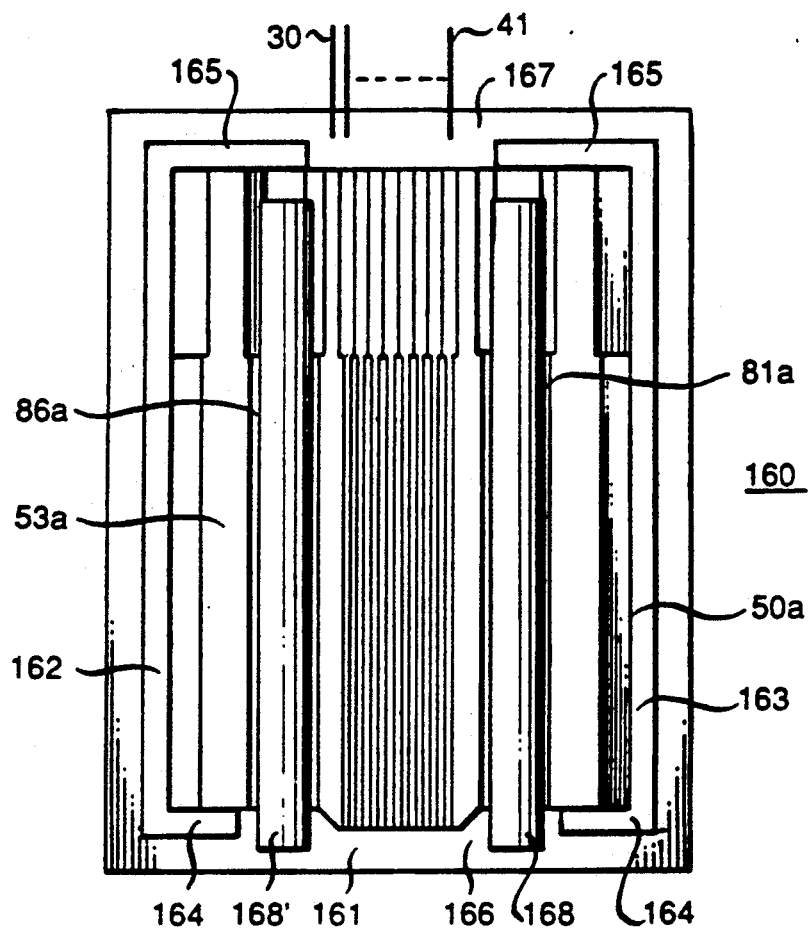
FIG. 10 is a schematic plan view of (a) a holding fixture used in the assembling of the plugs shown in FIG. 3, and (b) of the FIG. 4 guide plate received in that fixture.

After the fiber ends e have been inserted into the rear entries of the fiber channels c in plug 25, the sequence of events is the same as that earlier described in connection with FIG. 10. To summarize that sequence, the optical fibers are pushed forward through the fiber receptacle channels c until the fiber ends e pass through (and slightly beyond) the openings for these channels in the end face 88 of the nose 85 for the plug 25. The spacer pins 168, 168′ then removed from pin channels 115, 116, and the comb pins 392, 393 are likewise removed from these channels by pulling comb 390 away from plug 25.

When this is done, upper plate 500 closes towards lower plate 50b under the force exerted on these plates by clip 350 until that closing movement is stopped by the presence of the fibers f between plates. The outcome is that the fibers became properly laterally and transversely aligned with respect to each other. Adhesive material is then wicked into the rear openings of the fiber channels to form between plates 50a and 50b an adhesive body which is similar to the body 135 shown in FIG. 6. That body is then allowed to cure to bond-together the plates 50a and 50b.

The plug consisting of so-bonded plates 50a, 50b (and containing the fibers f) is then removed from clip 350 to have its end face 88 polished by fixture 179 as earlier described in connection with FIG. 12. When that polishing has been completed, plug 25 is replaced with clip 350 to reconstitute device 340, omitting, however, comb 390, and having in addition the adhesive body therein and the fibers f in the plug.

In the same fashion assemblage 340′ is removed from housing 300 and assembled in the field with the fibers f′ of ribbon cable 27′ to incorporate these fibers in the fiber receptacle channels of plug 25′ (comb 390′ being thereafter removed), and to bond the guide plates of plug 25′ together by an adhesive body in which fibers f′ are embedded. Plug 25′ is then removed from clip 350′, the front end face 88′ is polished by the use of fixture 179 in the same way as was done for plug 25, and the device 340′ is then reconstituted to be as before except for the omission of comb 390′ and the addition of an adhesive body therein and the fiber's f′ running through the plug 25′.

At this point the original assemblages 340, 340′ have been converted into reconstituted assemblages which are attached to (and form terminations for) the optical fiber cables 27 and 27′, respectively. Hereinafter any references to the assemblages or devices 340, 340′ will be (unless the context otherwise indicates) to such reconstituted devices.

To render the FIG. 14 optical connector in its final condition, the devices 340 and 340′ are reinserted into passage 301 of housing 300 to be retained within that housing as they were earlier held therein. As to reaching that final condition, a final description will now be given.

Assume for purposes of that description that device 340′ has already been placed and retained in housing 300 so that all that is needed to complete the FIG. 14 connector is to place and retain device 340 within that housing. To do so, the outer ends of the tabs 351, 352 of resilient clip 350 are deflected by hand towards each other to permit the lugs 370, 371 on these tabs to first enter passage opening 302 and next to advance into the passage 301. Note in such connection that the portions of tabs 351, 352 rearward of their fingers 360, 362 act as compression springs. Once the lugs 370, 371 have entered the passage, the tabs are released to cause the tips of the lugs 370, 371 to ride over the bottom and top wall surfaces, respectively, of passage 300 during continued advance thereinto of device 340. When, however, those lugs reach the notches 372, 373 extending into bottom and top housing sections 306, 305 from these wall surfaces, the lugs are impelled by the resilient strain in the deflected compression spring portions of the tabs to snap into these notches. When that occurs, the faces 374, 375 on the lugs engage with the corresponding faces 376, 377 of the backs of the notches, and the remaining deflection of the mentioned compression spring portions of the tabs causes such lug faces to bear with outwardly directed respective transverse forces against such notch faces.

The lug faces 374, 375 and notch faces 376, 377 are, however, wedging faces which convert such outward transverse forces into a longitudinal force displacing clip 350 incrementally rightward. The clip 350 in turn acts through its contact with the shoulders 357, 358 on plug 25 to displace it incrementally rightward so as, as shown in FIG. 15, to produce between the end faces 88 and 88' of plug 25 and 25' a mutual contact under yieldable pressure on the plugs, which pressure is continued so long as the two plugs are retained in housing 300 by their clips 350, 350'. In other words these clips in cooperation with housing 300 serve to preload the plugs 25, 25' to produce a maintained pressure contact between the exposed ends e of the fibers f in plug 25 and the exposed end e' of the fibers f' in plug 25' so long as the FIG. 14 connectors is used for optically splicing the fibers f and f'. To have such maintained pressure contact is desirable because significant optical signal losses would ensue, if such fiber ends e and e' were to lose contact with each other. In the absence, however, of forcible maintaining of such contact, it is easy for such loss of contact to occur for a variety of reasons.

As a case in point, when assembling the FIG. 1 connector by pushing together the plugs 25, 25' so as to advance the aligning pins 45', 45' into the pin channels in the plugs, there may be a tendency for the pins to undergo a slight contraction over their exposed sections 210, 210' under the compressive force exerted thereon in the course of pushing the plugs together to produce contact between their nose end faces 88 and 88'. It follows that, when such pushing is ended, there may be a tendency for such contraction of the pins to give way to an incremental lengthwise expansion thereof producing a small but undersirable separation of these end faces 88, 88' and of the fiber ends e and e' exposed in the planes of those end faces.

The active longitudinal forces exerted by plug 25 and 25' on each other to produce and maintain pressure contact between their nose end faces are accompanied by leftward and rightward reactive longitudinal forces exerted by the clips 350 and 350' on the lower and upper sections 306 and 305 of housing 300 through the lugnotch coupling of such clips to such sections. These leftward and rightward reactive forces are absorbed by coupling them through such sections to mutually cancel each other. That is, the leftward and rightward reactive forces by lugs 370 and 370' on the sides notches 372, 372' in housing section 306 cancel each other by being mutually coupled through that section which is placed in tension by these forces and serves therefore as a tie section. In similar manner, the leftward and rightward reactive forces produced by clip lugs 371, 371' on upper housing section 305 cancel each other through that section which is placed in tension by these latter forces and serves as a tie section therefore. From what has been said it will be evident that, in the FIG. 15 structure, the couplings for opposing against each other the leftward and rightward reactive forces produced by the active longitudinal forces acting on plugs 25, 25' (to keep them in pressure contact) are couplings distributed on transversely opposite sides of the line of action of these active forces rather than being on only one side of such line. That splitting of the reactive forces between couplings on opposite sides of such line of action provides the advantage that it avoids or reduces unwanted deflections of parts which might occur in response to the presence of such reactive forces if there is a coupling therefore on only one side of such line.

So far no mention has been made of how the aligning pins 45 and 45' behave during the placing of device 340 in housing 300. Shortly after that device has first been inserted through opening 302 into passage 300 the front openings of the pin channels 115, 116 in plug 25 will reach the tips 325, 325' of the aligning pins and, thereafter, the tapers on such pin tips will guide the aligning pins into these channels to become received therein to the extent shown in FIGS. 14 and 15. Because the pins 45 and 45' are mounted within housing 300 in somewhat loosely coupled relation therewith, the pins have enough freedom to move to produce the same alignments between themselves and the plugs 25, 25' as if they had no couplings to housing 300.

It is to be understood that the events accompanying the reception of device 340' in housing 300 to be seated therein as shown (FIGS. 14 and 15) are in all respects similar to the events described above as effecting and accompanying the reception of device 340 into that housing.

The improved optical connector which is the subject hereof will, in its final condition, be as shown as FIGS. 14 and 15 excepting that the combs 390 and 390' will have been removed, and excepting that the plugs 25 and 25' will respectively include adhesive bodies and the fibers f and f' of cables 27 and 27' and will be attached to these cables in a manner similar to that shown in FIG. 1.

The above described embodiments being exemplary only, it is to be understood that additions thereto, omissions therefrom and modifications thereof can be made without departing from the spirit of the invention. For example, it is feasible to extend the enlarged rear sections of the pin channels in plugs 25 and 25' longitudinally into the plugs beyond the notches formed in the plug to receive the aligning fingers of the clips associated with these plugs, and, concomitantly, to lengthen the mounting pins of the associated combs so that such pins will extend past such notches when inserted into such enlarged rear pin channel sections.

An effect of making such changes is that the transverse inward forces exerted by such fingers on the guide plates of the plug will then be longitudinally to the rear of the fronts of such pins, whereby such plates will be held flat against such pins to be maintained parallel to each other while being separated from each other by the enlarged transverse gap conducive to insertion of the optical fibers into their receptacle grooves in the plug. Thus, making such change provides the advantage that the comb mounting pins serve to appropriately enlarge such gap over its whole longitudinal extent, whence the spacer pins 168, 168' no longer have any useful function and can be dispensed with.

Accordingly, the invention is not to be considered as limited save as is consonant with the recitals of the following claims.

We claim:

1. The improvement in an optical splice plug for a plurality of optical fibers; said plug comprising: lower and upper synthetic resinous guide plates having respective inner sides, and each having formed in its inner side an array of longitudinal grooves for receiving such fibers ("fiber grooves") and, on laterally opposite sides of such fiber grooves, a pair of grooves for receiving aligning pins for alignedly coupling such plug with another optical device ("pin grooves"), said plates being in transversely superposed relation to have a common front and rear, and having their inner sides confronting each other across a transverse gap therebetween so that their respective pin grooves are opposite each other to define for such pins two channels each comprising an upper and a lower pin groove and a portion therebetween of said gap ("pin channels"), and so that their respective fiber grooves are opposite each other to define for said fibers an array of channels having rear entries thereinto for said fibers, and each comprising an upper and lower fiber groove and a portion therebetween of said gap ("fiber channels"); said improvement comprising: mechanical retaining means coupled with said plates to form therewith a portable durably united assemblage, said retaining means comprising mutually coupled lower and upper contact means disposed outward of said lower and upper plates, respectively, and engaging said plates to maintain them transversely superposed, and to exert yieldable force thereon urging them towards each other, and said retaining means constituting a resilient clip comprising lower and upper tabs disposed outward of, respectively, said lower and upper plates and carrying clip portions constituting said lower and upper contact means, said resilient clip further comprising a pair of "U" shape deflecting springs extending on opposite lateral sides of said superposed plates between said tabs to join them and render them transversely deflectable, said springs projecting longitudinally from said tabs towards said front of said plates to most closely approach such front by the mid-regions of the respective "U" shapes defined by said springs.

2. The improvement according to claim 1 in which said lower and upper plates have respective notches formed in the outer surfaces thereof, and in which said lower and upper contact means comprise lower and upper aligning fingers carried by and projecting from, respectively, said lower and upper tabs into said notches to be received therein without substantial angular play in the longitudinal-lateral plane so as to maintain said plates in lateral and longitudinal alignment.

3. The improvement according to claim 2 in which said lower and upper contact means further comprise lower and upper stabilizing fingers supplemental to, respectively, said lower and upper aligning fingers and contacting said lower and upper plates at positions offset from said notches.

4. The improvement in an optical splice plug for a plurality of optical fibers; said plug comprising: lower and upper synthetic resinous guide plates having respective inner sides, and each having formed in its inner side an array of longitudinal grooves for receiving such fibers ("fiber grooves") and, on laterally opposite sides of such fiber grooves, a pair of grooves for receiving aligning pins for alignedly coupling such plug with another optical device ("pin grooves"), said plates being in transversely superposed relation to have a common front and rear, and having their inner sides confronting each other across a transverse gap therebetween so that their respective pin grooves are opposite each other to define for such pins two channels each comprising an upper and a lower pin groove and a portion therebetween of said gap ("pin channels"), and so that their respective fiber grooves are opposite each other to define for said fibers an array of channels having rear entries thereinto for said fibers, and each comprising an upper and lower fiber groove and a portion therebetween of said gap ("fiber channels"); said improvement comprising: mechanical retaining means coupled with said plates to form therewith a portable durably united assemblage, said retaining means comprising mutually coupled lower and upper contact means disposed outward of said lower and upper plates, respectively, and engaging said plates to maintain them transversely superposed, and to exert yieldable force thereon urging them towards each other, said improvement further comprising a comb carried by said plates at the back thereof and comprising a member having formed therein a set of laterally spaced slots extending longitudinally through said member and down therein from its top to the bottoms of the rear entries of said fiber channels, such comb slots registering with such channel entries and being adapted to guide insertion thereinto of said fibers.

5. The improvement according to claim 4 in which said comb has two support pins respectively received in such two pin channels to thereby couple said comb with said plates.

6. The improvement in a multifiber optical connector comprising: first and second plugs each comprising a synthetic resinous casing having a longitudinally separated front and rear, each casing of each such plug having formed therein a pair of pin receptacle channels on laterally opposite sides of said casing and extending longitudinally therein to terminations of such channels at the front of such casing, each such plug also having at the front of its casing a planar front surface normal to the longitudinal axis of such plug, and each such plug having formed in its casing a plurality of fiber receptacle channels adapted to receive respective optical fibers therein and extending longitudinally in such casing from the rear thereof to openings of such channels formed in said front surface of such casing, and a pair of aligning pins each received in a pin receptacle channel respective thereto in both one and the other of said plugs to position the fronts of said first and second plugs in confronting relation with each other at a lateral-transverse midplane at the interface of such plug fronts, and to produce alignment between said openings in said first plug and said openings in said second plug of said fiber receptacle channels; said improvement comprising: plug retaining means constituted of a plurality of tie sections disposed outside of said plugs on opposite sides thereof in said plane, each such tie section longitudinally overlapping with both said plugs, and plug securing means coupling said first and second plugs on longitudinally opposite sides of said plane to each of said plurality of tie sections to thereby couple said plugs together through such sections.

7. The improvement according to claim 6 in which said fronts of said first and second plugs are in abutting relation with each other, and in which said securing means is resilient and deflected to preload said first and second plugs with yieldable force urging them towards each other so as to produce and maintain a yieldable pressure contact between said fronts of said plugs.

8. The improvement according to claim 6 in which said improvement further comprises pin support means securing said pair of aligning pins to said plug retaining means and mounting said aligning pins at central regions thereof so that each of said pins has separate pin segments projecting longitudinally outward oppositely from such support means for such pin.

9. The improvement in a multifiber optical connector comprising: first and second plugs each comprising a synthetic resinous casing having a longitudinally separated front and rear, such casing of each such plug having formed therein a pair of pin receptacle channels on laterally opposite sides of said casing and extending longitudinally therein to terminations of such channels at the front of such casing, each such plug also having at the front of its casing a laterally central nose projecting forwardly of such terminations and having a planar front surface normal to the longitudinal axis of such plug, and each such plug having formed in its casing a plurality of fiber receptacle channels adapted to receive respective optical fibers therein and extending longitudinally in such casing from the rear thereof to openings thereof formed in said front surface of said nose on such casing, and a pair of aligning pins each received in a pin receptacle channel respective thereto in both one and the other of said plugs to position the noses at the fronts of said first and second plugs in confronting relation with each other at a lateral-transverse midplane at the interface of such noses, and to produce alignment between said openings in said first plug and said openings in said second plug of said fiber receptacle channels, said improvement comprising: a tubular housing for said plugs, said housing having therein a passage extending between first and second openings therefore in said housing at longitudinally opposite ends of said passage, said first and second plugs being inserted into said first and second openings to be received in said passage, and said improvement further comprising plug securing means coupling each of said plugs to said housing to retain them therein.

10. The improvement according to claim 9 further comprising pin support means having two portions thereof disposed in said passage on laterally opposite sides of said noses of said plugs, said portions having formed therein respective longitudinal bores in which longitudinally central regions of said two aligning pins are respectively received, and each of said portions mounting the corresponding aligning pin so that such pin is secured relative to said housing and has separate pin segments projecting longitudinally outward into said passage oppositely away from such portion.

11. The improvement in a multifiber optical connector comprising: first and second plugs each having a front and rear and each comprising lower and upper synthetic resinous guide plates each having on an inner side thereof an array of longitudinal laterally spaced parallel V-sided fiber receptacle grooves ("fiber grooves") and a pair of longitudinal V-sided pin receptacle grooves ("pin grooves") on laterally opposite sides of such array and extending parallel to said fiber grooves, said pin grooves being greater in lateral cross section than said fiber grooves, and said plates being in transversely spaced relation with their inner sides confronting each other across a transverse gap therebetween so that their respective pin grooves are opposite each other to define two pin channels each comprising an upper and a lower pin groove, and so that their respective fiber grooves define an array of fiber channels each comprising an upper and a lower fiber groove, and each extending longitudinally through the corresponding plug to openings of such channels at the front of such plug, and a pair of aligning pins each received in a pin channel respective thereto in both one and the other of said plugs to produce an alignment between the fiber channel openings in, respectively, said first and second plugs; said improvement comprising: a tubular housing for retaining said plugs, said housing having therein a passage extending between first and second openings therefore in said housing at longitudinally opposite ends of said passage, said first and second plugs being received in said passage to be adjacent to, respectively, said first and second openings; and said improvement further comprising first and second resilient clips disposed in said passage corresponding to adjacent to, respectively, said first and second plugs, each of said clips having lower and upper resiliently deflectable tabs disposed in said passage transversely outward of, respectively, the lower and upper guide plates of the corresponding plug, and each of such tabs of each of said clips being coupled in resiliently deflected condition in said passage both to the inside of said housing and to the outside of the nearer guide plate of the corresponding plug so as both to urge that plate transversely towards the other plate of such plug and to urge such plug longitudinally towards the other plug of such optical connector.

12. The improvement according to claim 11 in which each of said resilient clips further comprises pair of "U" shaped deflection springs extending in said passage on laterally opposite sides of the corresponding plug between said tabs of such clip to join them together, said plates of said plug have forward laterally projecting portions on laterally opposite sides of such plug and providing backward facing shoulders on such sides, and in which said springs of each such clip project longitudinally forwards from said tabs thereof to engage with said shoulders on said plates of the corresponding plug so as by such contact to urge that plug towards the other plug of such optical connector.

13. The improvement according to claim 11 in which each of the lower and upper tabs of each of such two clips has a first contact part received in an indentation formed in said housing in the inner wall of said passage to couple said tab to said housing, and in which each of such lower and upper tabs has a further contact part received in an indentation formed in the plate nearest such tab of the corresponding plug to couple such tab to such plate and plug.

* * * * *